(12) United States Patent
Padilha et al.

(10) Patent No.: US 11,037,227 B1
(45) Date of Patent: Jun. 15, 2021

(54) BLOCKCHAIN-BASED DECENTRALIZED STORAGE SYSTEM

(71) Applicant: StorCentric, Inc., Sunnyvale, CA (US)

(72) Inventors: Ricardo Padilha, Florianópolis (BR); Rodney George Harrison, London (GB); Terence Rokop, Aloha, OR (US); Michael J. Edwards, Hillsborough, CA (US)

(73) Assignee: StorCentric, Inc., Sunnyvale, CA (US)

( * ) Notice: Subject to any disclaimer, the term of this patent is extended or adjusted under 35 U.S.C. 154(b) by 272 days.

(21) Appl. No.: 16/198,090

(22) Filed: Nov. 21, 2018

Related U.S. Application Data

(60) Provisional application No. 62/589,848, filed on Nov. 22, 2017.

(51) Int. Cl.
| | | |
|---|---|---|
| *G06Q 30/06* | (2012.01) | |
| *H04L 9/08* | (2006.01) | |
| *G06F 21/64* | (2013.01) | |
| *G06F 21/60* | (2013.01) | |

(52) U.S. Cl.
CPC ....... *G06Q 30/0645* (2013.01); *G06F 21/602* (2013.01); *G06F 21/64* (2013.01); *H04L 9/0819* (2013.01)

(58) Field of Classification Search
None
See application file for complete search history.

(56) References Cited

U.S. PATENT DOCUMENTS

| | | | |
|---|---|---|---|
| 2018/0217898 A1* | 8/2018 | Tormasov | G06Q 20/42 |
| 2018/0337904 A1* | 11/2018 | Letourneau | H04L 63/06 |
| 2019/0005469 A1* | 1/2019 | Dhupkar | G06Q 20/06 |
| 2019/0012249 A1* | 1/2019 | Mercuri | G06F 9/451 |
| 2019/0065593 A1* | 2/2019 | Barski | G06F 16/95 |
| 2019/0102163 A1* | 4/2019 | Witherspoon | G07C 13/00 |
| 2019/0258499 A1* | 8/2019 | Annapragada | G06F 9/45541 |

OTHER PUBLICATIONS

Doka K., Bakogiannis T., Mytilinis I., Goumas G. (2019) CloudAgora: Democratizing the Cloud. In: Joshi J., Nepal S., Zhang Q., Zhang LJ. (eds) Blockchain—ICBC 2019. ICBC 2019. Lecture Notes in Computer Science, vol. 11521. Springer, Cham. https://doi.org/10.1007/978-3-030-23404-1_10 (Year: 2019).*

(Continued)

*Primary Examiner* — Jacob C. Coppola
(74) *Attorney, Agent, or Firm* — Sunstein LLP

(57) ABSTRACT

A computer-implemented method reliably stores data in a blockchain-based distributed storage system. The method utilizes computer processes carried out by a host computing device, including receiving from a renter computing device a storage contract proposal, sending over the network, by the host computing device to the renter computing device and to the blockchain, an acceptance of the storage contract proposal, and receiving from the blockchain, confirmation that a storage contract between the host computing device and the renter computing device has been added to the blockchain. After the data have been stored, the processes include computing a checksum, sending it to the renter computing device and to the blockchain and receiving, from the blockchain, confirmation that the checksum has been added to the blockchain.

7 Claims, 20 Drawing Sheets

(56) References Cited

OTHER PUBLICATIONS

Armbrust et al., "Above the Clouds: A Berkeley View of Cloud Computing," Electrical Engineering and Computer Sciences University of California at Berkeley, Technical Report No. UCB/EECS-2009-28, http://www.eecs.berkeley.edu/Pubs/TechRpts/2009/EECS-2009-28.html (Year: 2009).*

C. Decker, J. Seidel, and R. Wattenhofer, "Bitcoin Meets Strong Consistency," Proceedings of the 17th International Conference on Distributed Computing and Networking, Ser. ICDCN '16. New York, NY, USA. ACM, 2016, pp. 13:1-13:10.

C. Dwork and M. Naor, "Pricing via Processing or Combatting Junk Mail," Springer Berlin Heidelberg, Berlin, Heidelberg. 1993, pp. 139-147.

D. Bradbury, "What is the Carbon Footprint of a Bitcoin?" https://www.coindesk.com/carbon-footprint-bitcoin, Apr. 2014, 4 pages.

I. Bentov, et al., "Proof of activity: 30 Extending Bitcoin's Proof of Work via Proof of Stake," Performance Evaluation Review, vol. 42, No. 3, Dec. 2014, pp. 34-37.

S. King and S. Nadal, "Ppcoin: Peer-to-peer crypto-currency with proof-of-stake," Aug. 2012, http://peerco.in/assets/paper/peercoin-paper.pdf, 6 pages.

S. Popov, "A Probabilistic Analysis of the Nxt Forging Algorithm," *Ledger*, vol. 1, 2016, pp. 69-83.

Blackcoin, "Security Analysis of Proof-of-Stake Protocol v3.0," https://bravenewcoin.com/assets/Whitepapers/Blackcoin-POS-3.pdf, Oct. 2016, 5 pages.

N. community, "Nxt whitepaper," https://www.dropbox.com/s/cbuwrorf672c0yy/NxtWhitepaper_v122_rev4.pdf, Jul. 2014, 28 pages.

N. Houy, "It will cost you nothing to 'kill' a Proof-of-Stake crypto-currency," https://ssrn.com/abstract=2393940, Jan. 2014, 6 pages.

A. Poelstra et al., "Distributed Consensus from Proof of Stake is Impossible," https://download.wpsoftware.net/bitcoin/alts.pdf, May 2014, pp. 1-5.

L. Ren, "Proof of Stake Velocity: Building the Social Currency of the Digital Age," https://www.reddcoin.com/papers/PoSV.pdf, Apr. 2014, pp. 1-13.

A. S. Aiyer, et al., "BAR Fault Tolerance for Cooperative Services," *SIGOPS Oper. Syst. Rev.*, vol. 39, No. 5, Oct. 2005, 14 pages.

M. Bellare and C. Namprempre, "Authenticated Encryption: Relations among notions and analysis of the generic composition paradigm," Jounal of Cryptology, vol. 21, Issue 4, pp. 469-491.

R. Padilha and F. Pedone, "Belisarius: BFT storage with confidentiality," IEEE 10th International Symposium on Network Computing and Applications, Aug. 2011, 8 pages.

Drobo, "Drobo™ BeyondRAID™ Simplifies Storage Deployment and Management," http://drobo.wpengine.netdna-cdn.com/wp-content/uploads/Beyond-Raid-01-01-15.pdf, Jan. 2015, 15 pages.

P. Labs, "Filecoin: A Decentralized Storage Network," https://filecoin.io/filecoin.pdf, Aug. 2017, pp. 1-36.

J. Benet, "IPFS—Content Addressed, Versioned, P2P File System," *CoRR*, vol. abs/1407.3561, 2014, 11 pages.

H. Pagnia and F. C. Gärtner, "On the Impossibility of Fair Exchange without a Trusted Third Party," Darmstadt University of Technology, Department of Computer Science, Darmstadt, Germany, Tech. Rep. TUD-BS-1999-02, Mar. 1999, 15 pages.

D. Vorick and L. Champine, "Sia: Simple Decentralized Storage," https://www.sia.tech/whitepaper.pdf, Nov. 29, 2014, pp. 1-8.

S. Wilkinson, et al., "Storj—A Peer-to-Peer Cloud Storage Network," http://citeseerx.ist.psu.edu/viewdoc/download;jsessionid=E964E648EE996B85207AB47EDC9630E9?doi=10.1.1.693.785&rep=rep1&type=pdf, Dec. 2014, pp. 1-18.

V. Trón, A. Fischer, D. A. et al., "Swap, Swear and Swindle: incentive system for swarm," http://swarm-gateways.net/bzz:/theswarm.eth/ethersphere/orange-papers/1/sw%5E3.pdf, May 2016, pp. 1-30.

S. Halevi, D. Harnick et al., "Proofs of Ownership in Remote Storage System," Proceedings of the 18th ACM Conference on Computer and Communications Security, Ser. CCS '11. New York, NY, USA, ACM, 2011, http://doi.acm.org/10.1145/2046707.2046765, pp. 491-500.

"Sia—Decentralized Cloud Storage" by David Vorick at Mit Bitcoin 2016: https://www.youtube.com/watch?v=cR8YL05nq4A.

"Swarm Research Update" at Ethereum Meetup Berlin 2016: https://www.youtube.com/watch?v=Y9kch84cbPA.

\* cited by examiner

BLOCKCHAIN-BASED DECENTRALIZED STORAGE SYSTEM

RELATED APPLICATIONS

This application claims to the benefit of U.S. Application No. 62/589,848, entitled "Blockchain-based Decentralized Storage System" and filed Nov. 22, 2017, which is hereby incorporated by reference in its entirety.

TECHNICAL FIELD

The present invention relates generally to a blockchain-based decentralized storage system.

BACKGROUND ART

Blockchains are at the center of a revolution in decentralized systems, since they provide a fundamental building block for intrinsically adversarial environments such as the Internet: a trustworthy ledger for financial transactions.

There already have been some attempts to develop blockchain-based decentralized storage systems, one example of which is the so-called InterPlanetary File System (IPFS).

Filecoin defines itself as a way to "guarantee storage of IPFS content in exchange of Filecoin tokens" [16]. In other words, Filecoin is a monetization layer on top of IPFS [17], using a Proof-of-Spacetime blockchain. Proof-of-Replication is a Proof-of-Stake derivative, based on the amount of space that a miner is willing to commit to the network. A miner must prove that they possess the required relevant data before they can mine, and that data is obtained by replicating other node's content. Clients can pay for storage of their data in Storage Miners using contracts on the blockchain. Nodes that replicate that data to be able to mine can later become a Retrieval Miner, and be paid to deliver the data.

Contracts are not directly negotiated between clients and miners. Clients must submit bid orders to the blockchain, and storage miners must submit ask orders. The current miner is responsible for matching bid and ask orders, and assigning client data to that storage miner. Since there is no input from the client besides the bid price, there is little Quality-of-Service that can be enforced from the point-of-view of the client. As long as the basic order matching algorithm is respected, nothing seems to prevent the current miner from favoring a given pool of other storage miners, which can then collude to amass more stored data, and thus increase the chance of being selected to be the next miner. Furthermore, under proof-of-replication there seems to be no incentive for a storage miner to allow replication of its data, since the more exclusive its dataset is, the higher the probability that it will be selected to be the next miner.

Filecoin does not specify how miners are incentivized for delivering data besides a mention of payment channels that exist off-chain, and as such there are no guarantees that they will be Byzantine fault-tolerant [18]. The Filecoin authors do note, however, that a BFT data delivery could exist, but it would require a trusted third party (such as the blockchain), but they claim that a blockchain-based retrieval protocol would not be fast enough.

Sia [19] offers file storage based on contracts on a Proof-of-Work blockchain. Storage is rented using contracts on the blockchain, which define at the moment of inclusion on the blockchain the renter, the host, the duration, and the data's Merkle tree root. Both renter and host provide full payment and collateral at the contract creation. These funds are held in escrow until the contract ends. At that point, once the host provides proof-of-storage, payment is released. If the host cannot provide proof-of-storage, then the collateral is given to the renter.

Sia distinguishes itself by having a working, readily available software stack that can be used to access its fully distributed storage network. This network, however, suffers from the same problems as the Bitcoin blockchain. According to the Sia creators [23], Sia is capable of supporting 50 million file contracts per year. They claim that the average user will require between 20 and 200 file contracts per year, and will thus be able to support only between 250 thousand and 2.5 million users. The Proof-of-Work blockchain also poses a considerable burden on the sustainability of the system.

Also according to its creators, Sia is vulnerable to Sybil attacks (i.e., in which a single identity generates a multitude of fake identities to skew host selection). The proposed solution is for hosts to provide proof-of-burn by sending 4% of their revenue to provably unspendable addresses. In other words, Sia hosts must provide Proof-of-Stake to demonstrate their honesty. To compensate for this loss of coins, Sia has an inflation that is currently around 30% per year, and should stabilize at 3% per year in the long term [24].

StorJ [20] defines a decentralized peer-to-peer storage network that may or may not use a blockchain for contracts. Even when a blockchain is available, all contract negotiation is performed off-chain. Files are encoded with a M-of-N erasure encoding, which allows clients to tolerate missing or malicious hosts.

Clients must keep track of their metadata, i.e., which files were uploaded to which hosts. Alternatively, clients may delegate metadata handling to a bridge. In its current implementation, bridges are complex to run and maintain, which has led to a perception that StorJ is centralized around the official bridge service. Storj has introduced the concept of a Federated Bridge, but there is little detail on how such a service would work, or even which incentives would be in place to ensure its correct behavior.

StorJ has no Byzantine fault-tolerance, and instead suggests that reputation systems be used to ensure that honest peers are selected. To prevent Sybil attacks, StorJ relies on a Proof-of-Stake algorithm in which servers are supposed to issue blockchain payments to themselves periodically.

Swarm [21] proposes a content-addressable, chunk-based, incentivized storage network based on the Ethereum blockchain. Although not explicitly Byzantine fault-tolerant, Swarm attempts to reward correct behavior and punish incorrect behavior by: (a) establishing a bandwidth credit swap between peers, (b) using contracts to buy bandwidth credit when required, and (c) using contracts to buy storage space for unpopular content that must remain in the network.

There seems to be no incentive for a node in the network to participate in the propagation of important, but non-incentivized messages such as proof-of-custody challenges and receipts. In other words, routing of messages operates on an altruistic basis, with no punishment for bad or absent behavior. Storage of popular content is assumed to be self-sustaining and auto-scaling through bandwidth credits alone (either by bandwidth exchange or by direct bandwidth purchase) [25]. This auto-scaling claim relies on the assumption that nodes would rather cache as many chunks as possible to avoid spending their bandwidth credits. This claim makes an implicit assumption that storage (be it on disk or RAM) is cheaper than bandwidth, and that caching will be efficient regardless of network topology. Unpopular content is at risk of not being retrieved at all, since routing nodes may consider retrieving and forwarding specific chunks not worth the cost in bandwidth credits.

Persistence of unpopular content is guaranteed by additional storage payments, which are enforced by guardians. Guardians monitor custodians on behalf of the chunk owner. Custodians are responsible for ensuring that a block under their custody can be retrieved at any time, under pain of loss of deposit (i.e., collateral). Chunks are stored in the node whose address is closest to their hash, which limits the owner's choice of host, thus limiting support for Quality-of-Service. In fact, Swarm offers no guarantee about a level of service for any given chunk, only that the guardian will be held accountable for its availability. In other words, it is not possible in Swarm to ensure that chunks will remain within a given domain (e.g., EU-only due to data protection laws).

Of course, blockchain technology is not without problems. In particular, there are ongoing debates about the environmental impact of Proof-of-Work consensus, the security of the blockchain-backed contracts (in particular the lack of Byzantine fault tolerance), and usability of the blockchain by the community (observed by the scarcity of decentralized applications built on top of these networks).

The following prior art references are incorporated herein by reference and cited in this application using the corresponding bracketed numbers:

[1] C. Decker, J. Seidel, and R. Wattenhofer, "Bitcoin meets strong consistency," in *Proceedings of the 17th International Conference on Distributed Computing and Networking*, ser. ICDCN '16. New York, N.Y., USA: ACM, 2016, pp. 13:1-13:10. [Online], Available: http://doi.acm.ore/10.1145/2833312.2833321

[2] C. Dwork and M. Naor, *Pricing via Processing or Combatting Junk Mail*. Berlin, Heidelberg: Springer Berlin Heidelberg, 1993, pp. 139-147. [Online], Available: https://doi.org/10.1007/3-540-48071-4_10 and http://www.wisdom.weizmann.ac.l/~naor/PAPERS/pvp.pdf

[3] D. Bradbury, "What is the carbon footprint of a bitcoin?" https://www.coindesk.com/carbon-footprint-bitcoin/(last checked September 2017), April 2014

[4] I. Bentov, C. Lee, A. Mizrahi, and M. Rosenfeld, "Proof of activity: 30 Extending bitcoin's proof of work via proof of stake [extended abstract]," *SIGMETRICS* velocity: Building the social currency of the digital age," https:/7coss.io/documents/white-papers/reddcoin.pdf (last checked September 2017), April 2014

[5] S. King and S. Nadal, "Ppcoin: Peer-to-peer cryptocurrency with proof-of-stake," August 2012, http://peer-co.in/assets/paper/peercoin-paper.pdf (last checked September 2017) and https://pdfs.semanticscholar.org/0db3/8d32069f3341d34c35085dc009a85ba13c13.pdf, available Nov. 18, 2018.

[6] S. Popov, "A probabilistic analysis of the nxt forging algorithm," *Ledger*, vol. 1, no. 0, pp. 69-83, 2016. [Online]. Available: http://www.ledgerjournal.org/ojs/index.php/ledger/article/view/46

[7] Blackcoin, "Security analysis of proof-of-stake protocol v3.0," https://bravenewcoin.com/assets/Whitepapers/Blackcoin-POS-3.pdf (last checked September 2017), October 2016.

[8] N. community, "Nxt whitepaper," https://www.dropbox.com/s/cbuwrorf672c0yy/NxtWhitepaper_v122_rev4.pdf (last checked September 2017), July 2014.

[9] N. Houy, "It will cost you nothing to 'kill' a proof-of-stake crypto-currency," February 2014, available Nov. 18, 2018 at https://papers.ssrn.com/sol3/papers.cfm?abstract_id=2393940.

[10] A. Poelstra et al., "Distributed consensus from proof of stake is impossible," https://download.wpsoftware.net/bitcoin/old-pos.pdf (last checked September 2017), May 2014.

[11] L. Ren, "Proof of stake velocity: Building the social currency of the digital age," April 2014, https://coss.io/documents/white-papers/reddcoin.pdf (last checked September 2017) available Nov. 18, 2018 at https://assets.coss.io/documents/white-papers/reddcoin.pdf

[12] A. S. Aiyer, L. Alvisi, A. Clement, M. Dahlin, J.-P. Martin, and C. Porth,"Bar fault tolerance for cooperative services," *SIGOPS Oper. Syst. Rev.*, vol. 39, no. 5, pp. 45-58, October 2005. [Online], Available: http://doi.acm.org/10.1145/1095809.1095816 and http://citeseerx.ist.psu.edu/viewdoc/download?doi=10.1.1.478.2996&rep=rep1&type=pdf

[13] M. Bellare and C. Namprempre, *Authenticated Encryption: Relations among Notions and Analysis of the Generic Composition Paradigm*. Berlin, Heidelberg: Springer Berlin Heidelberg, 2000, pp. 531-545. [Online], Available: https://link.springer.com/content/pdf/10.1007/3-540-44448-3_41.pdf

[14] R. Padilha and F. Pedone, "Belisarius: Bft storage with confidentiality," in 2011 *IEEE 10th International Symposium on Network Computing and Applications*, August 2011, pp. 9-16

[15] Drobo, "Drobo BeyondRaid simplifies storage deployment and management," http://drobo.wpengine.netdna-cdn.com/wp-content/uploads/Beyond-Raid-01-01-15.pdf (last checked September 2017), January 2015.

[16] P. Labs, "*Filecoin: A decentralized storage network*," https://filecoin.iojilecoin.pdf (last checked September 2017), August 2017.

[17] J. Benet, "IPFS—content addressed, versioned, P2P file system," *CoRR*, vol. abs/1407.3561, 2014. [Online], Available: http://arxiv.org/abs/1407.3561

[18] H. Pagnia and F. C. Gartner, "On the impossibility of fair exchange without a trusted third party," Darmstadt University of Technology, Department of Computer Science, Darmstadt, Germany, Tech. Rep. TUD-BS-1999-02, March 1999

[19] D. Vorick and L. Champine, "Sia: Simple decentralized storage," 15 https://www.sia.tech/whitepaper.pdf (last checked September 2017), November 2014

[20] S. Wilkinson, T. Boshevski, J. Brandoff, J. Prestwich, G. Hall, P. Gerbes, P. Hutchins, and C. Pollard, "Storj—a peer-to-peer cloud storage network," http://citeseerx.ist.psu.edu/viewdoc/download; jsessionid=E964E648EE996B85207A B47EDC9630E9?doi=10.1.1.693.785&rep=rep1&type=pdf (last checked Nov. 18, 2018), December 2016

[21] V. Tr_n, A. Fischer, D. A. Nagy, and Z. Felf ldi, "swap, swear and swindle: incentive system for swarm," http://swarm-gateways.net/bzz:/theswarm.eth/ethersphere/orange-papers/1/sw%5E3.pdf (last checked Nov. 18, 2018), May 2016

[22] S. Halevi, D. Harnik, B. Pinkas, and A. Shulman-Peleg, "Proofs of ownership in remote storage systems," in *Proceedings of the 18th ACM Conference on Computer and Communications Security*, ser. CCS '11. New York, N.Y., USA: ACM, 2011, pp. 491-500. [Online], Available: http://doi.acm.org/10.1145/2046707.2046765

[23] "Sia—Decentralized Cloud Storage" by David Vorick at Mit Bitcoin 2016: https://www.youtube.com/watch?v=cR8YL05nq4A

[24] Siacoin charts: http://siapulse.com/page/market

[25] "Swarm Research Update" at Ethereum Meetup Berlin 2016: https://www.youtube.com/watch?v=Y9kch84cbPA

SUMMARY OF THE EMBODIMENTS

In accordance with one embodiment of the invention, there is provided a computer-implemented method of reliably storing data in a storage system, the system being distributed over a network and having a stored blockchain accessible over the network to a host computing device and to a renter computing device. The method utilizes computer processes carried out by the host computing device. The computer processes include receiving over the network, by the host computing device from the renter computing device, a storage contract proposal; sending over the network, by the host computing device to the renter computing device, an acceptance of the storage contract proposal; and making a determination if the blockchain has received from the renter computing device a signed storage contract and has stored the contract. If the determination is favorable, the processes further include (a) receiving over the network, by the host computing device from the renter computing device, an upload of data to be stored according to the storage contract; (b) computing, by the host computing device, a checksum of the uploaded data from the renter computing device; and (c) sending over the network, by the host computing device to the renter computing device and to the blockchain, the computed checksum of the data. Lastly, the processes include making a determination if the blockchain has received from the renter computing device the renter computing device's validation of the host's computed checksum, and if the determination is favorable, then maintaining by the host computing device the uploaded data in storage pursuant to the contract.

In various embodiments, the computer processes include adding a signature of the host computing device to the storage contract proposal. Alternatively or in addition, the computer processes include sending over the network, by the host computing device to the renter computing device, a rejection of the storage contract proposal. In a further related embodiment, making a determination if the blockchain has received from the renter computing device a signed storage contract comprises making a determination if the blockchain is storing a storage contract that includes signatures of both the renter computing device and the host computing device.

In another related embodiment, the computer processes include storing, by the host computing device, the uploaded data received from the renter computing device. Alternatively or in addition, the computer processes include encrypting, by the host computing device, the uploaded data received from the renter computing device. Also alternatively or in addition, the computer processes include adding a signature of the host computing device to the computed checksum. In another related embodiment, the computer processes include, after making a favorable determination that the blockchain has received from the renter computing device the renter computing device's validation of the host's computed checksum, generating, by the host computing device, proof of storage of the data from the renter computing device. Optionally, the computer processes further include sending over the network, by the host computing device to the blockchain, a signed statement including the proof of storage, according to the verification schedule of the storage contract.

In another embodiment of the invention, there is provided a computer-implemented method of delivering data that has been reliably stored data in a storage system, the system being distributed over a network and having a stored blockchain accessible over the network to a host computing device and to a renter computing device. The method utilizes computer processes carried out by the host computing device.

The computer processes of such method include receiving over the network, by a host computing device from a renter computing device, a download contract proposal; sending over the network, by the host computing device to the renter computing device, an acceptance of the download contract proposal; and making a determination if the blockchain has received from the renter computing device a signed download contract and has stored the download contract. The computer processes of such method further include, if the determination is favorable, (a) encrypting, by the host computing device, the stored data specified in the download contract; (b) computing, by the host computing device, a checksum of the encrypted data; and (c) sending over the network, by the host computing device, the encrypted data to the renter computing device. Additionally, the processes include receiving over the network, by the host computing device from the renter computing device, a checksum of the data received by the renter computing device; and comparing, by the host computing device, the checksum received from the renter computing device with the checksum computed by the host computing device. The computer processes also include, if the checksum received from the renter computing device matches the checksum computed by the host computing device, sending over the network, by the host computing device, a key for decrypting the encrypted data.

In a related embodiment, the computer processes also include sending information about a key that will be used to encrypt the data to be downloaded. Optionally, the information about the key is a hash of the key. In a related embodiment, encrypting the stored data includes dividing the data into chunks and encrypting each chunk of data. Alternatively or in addition, sending the key for decrypting the encrypted data inclueds adding, by the host computing device, a signature of the host computing device to the checksum signed by and received from the renter computing device; and sending over the network, by the host computing device, the signed checksum with the key. Optionally, sending the key for decrypting the encrypted data includes sending over the network, by the host computing device, the key to the renter computing device. Alternatively, sending the key for decrypting the encrypted data include includes sending over the network, by the host computing device, the key to the blockchain.

BRIEF DESCRIPTION OF THE DRAWINGS

The foregoing features of embodiments will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Definitions

As used in this description and the accompanying claims, the following terms shall have the meanings indicated, unless the context otherwise requires:

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "computing device" is a computer that is used by a user and may be implemented as a desktop unit, a laptop unit, a tablet, a smartphone, a server, or as any other computer having access to a computer network.

A "set" includes at least one member.

A "proxy" is a computing device capable of forming a bridge between another computing device and the decentralized storage system.

A "host computing device" is a computing device operated directly, or through a proxy, by a user to be a storage provider for other computing devices.

A "renter computing device" is a computing device operated by a user to store data on a host computing device.

A "sentinel" is a computing device configured to communicate with host computing devices to repair data that has been stored thereupon.

The term "blockchain" with a lowercase "b" is used herein to refer to blockchain technology generally, while the term "Blockchain" with an uppercase "B" is used herein to refer to exemplary embodiments of blockchain technology described herein.

Introduction

Figure 1:
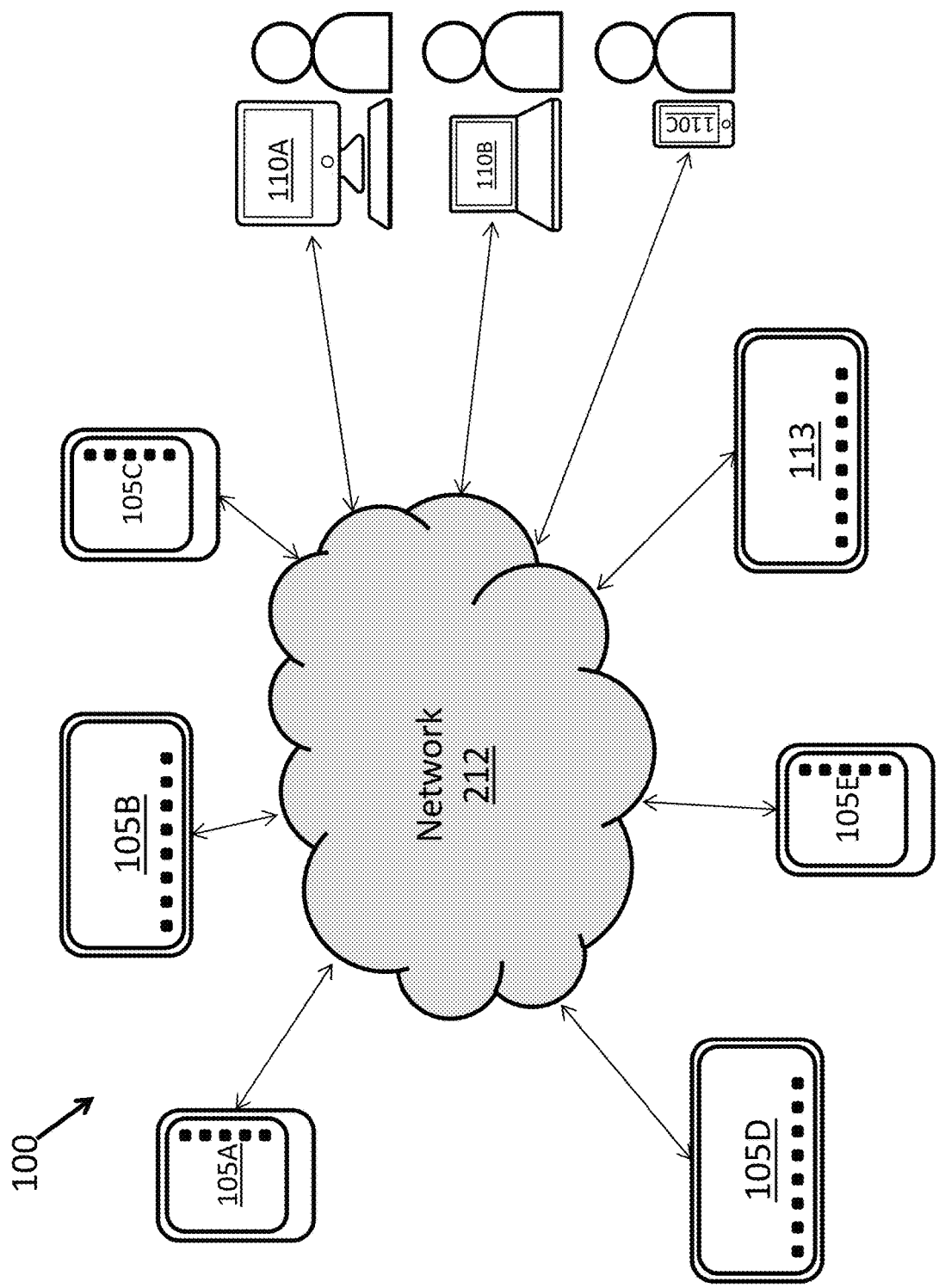
FIG. 1 is a block diagram of a blockchain-based decentralized storage system, according to an embodiment of the present invention, in which renter computing devices and host computing devices communicate to negotiate and execute storage contracts.

FIG. 1 is a block diagram of a blockchain-based decentralized storage system ("DSS system") 100, according to an embodiment of the present invention, in which renter computing devices 110A, 110B, and 110C (collectively "110", also referred to herein as "renters") and host computing devices 105A, 105B, 105C, and 105D (collectively "105"; also referred to herein as "hosts") communicate to negotiate and execute storage contracts. The DSS system 100 can also include sentinels 113 to repair data that has been stored on hosts 105. Furthermore, all of the members of the DSS system 100—hosts 105, renters 110, and sentinels 113 alike, communicate with one another on a peer-to-peer basis.

Certain embodiments of the invention present a new distributed, secure, reliable blockchain-based decentralized storage system 100 backed by scalable, state-of-the-art blockchain technology to provide decentralized storage and applications that addresses deficiencies of the prior art. In particular, while conventional blockchain technology provides strong Byzantine fault tolerance (BFT) protections solely for on-chain transactions, i.e., transactions that add blocks to the blockchain, in contrast, embodiments of the DSS system 100 of the present invention described herein operate according to protocols that all exhibit strong Byzantine fault tolerance (BFT) protections. Consequently, the DSS system 100 can establish distributed storage contracts in a more secure and robust manner, compared to the prior art.

One exemplary embodiment of the DSS system 100 uses distributed storage provided by local, highly-available storage devices from Drobo, Inc., of Sunnyvale, Calif. [15], although other types of storage devices and systems can be used in various alternative embodiments in lieu of, or in addition to, the Drobo-based storage.

Embodiments of the blockchain-based decentralized storage system 100 rely upon a complete stack for supporting Decentralized Applications (also referred to herein as "Dapps"). This stack has three layers:

The blockchain-based Byzantine fault-tolerant contract engine 120

An API layer 135 that gives a simple-to-use and familiar object storage interface to use the DSS system 100

Decentralized Applications (Dapps) executing on storage engines 125 (shown a 125A, 125B, 125C, and 125D in FIG. 3) to provide decentralized cloud-based storage, which in turn provides affordable, easy-to-use, full backup and disaster recovery.

Embodiments of the DSS system 100 are expected to follow best practices in blockchain design and to implement state-of-the-art protocols. Specifically, the DSS system 100 embodiments should adhere to the following guidelines:

All good behavior should be incentivized.

All bad behavior should be discouraged, either by penalty or by removing all incentives.

Scalability is a fundamental requisite.

System Model and Assumptions

Each host 105 in the DSS system 100 includes a contract engine 120 (described in connection with FIG. 3) configured to follow one or more protocols that have been established according to embodiments of the invention. These protocols define the types of transactions available in the DSS system 100. In particular, the protocols define how transactions are processed, particularly by specifying how the hosts 105, renters 110, sentinels 113, and the Blockchain 130 (described in connection with FIG. 3) interact to achieve various functions to support distributed storage on the DSS system 100. In various embodiments, as will be described in subsequent sections, a contract engine 120 is configured to follow protocols to:

store data from a renter 110 on a host 105 (the "PUT" protocol)

store data from a renter 110 on multiple hosts 105 with heightened security (the "STOR" protocol)

extend the duration for which a host 105 stores data from a renter 100 (the "EXT" protocol)

download stored data from a host 105 (the "GET" protocol)

download data that has been stored on multiple hosts 105, with heightened security (the "RETR" protocol)

permit third parties to access renter's 110 data stored on the host 105 (the "PERM" protocol)

commission a sentinel 113 to repair data stored on hosts 105 (the "SEN" protocol)

repair data stored on hosts 105 (the "FIX" protocol)

A host 105 also includes a storage engine 125 (namely 125A, 125B, 125C, and 125D in FIG. 3), which provides reliable, secure, and private data storage. For example, the storage engine 125 may store data on disk. In another example, the storage engine 125 may communicate with one or more databases to store data remotely. Various embodiments of the storage engine 125 may use non-volatile storage.

A host 105 also executes software to replicate blocks on the Blockchain 130. The host 105 may store every block on the Blockchain 130 that is pertinent to the DSS system 100. As a result, the host 105 may field queries from other members of the DSS system 100 (e.g., renters 110, other hosts 105, or sentinels 113), regarding blocks that have been validated and thus added to the Blockchain 130. In this manner, as a participant in the Blockchain 130, the host 105 serves as a ledger whose contents may be inspected by any interested party. In further embodiments, according to blockchain protocols, the host 105 may be selected by the Blockchain 130 to validate the next block to be added to a chain (i.e., to server as a "minter", as will be described in more detail below).

In various embodiments, a host 105 can also function as a renter 110. Thus, the host 105 may execute protocols in the contract engine 120 to negotiate contracts for storing its own data on another host 105. However, a renter 110 is not required to serve as a host 105. For example, a renter 110 may be a computing device that executes an API client 135 to communicate with the API server 140 of a host 105C. In this manner, the renter 110 directs the host 105C, via the API client 135, to execute protocols with other hosts 105 on the DSS system 100. By using host 105C as a proxy, the renter 110 can participate in the DSS system 100, but is otherwise spared from the computational processing burden incurred by executing a contract engine 120, storage engine 125, and the Blockchain 130.

A host 105 can also function as a sentinel 113. Renters 110 enter agreements with sentinels 113 to repair data stored on hosts 105. Thus, sentinels 113 execute protocols in the contract engine 120 to identify compromised data, and ensure that the respective host 105 stores a copy of accurate data.

Figure 2:
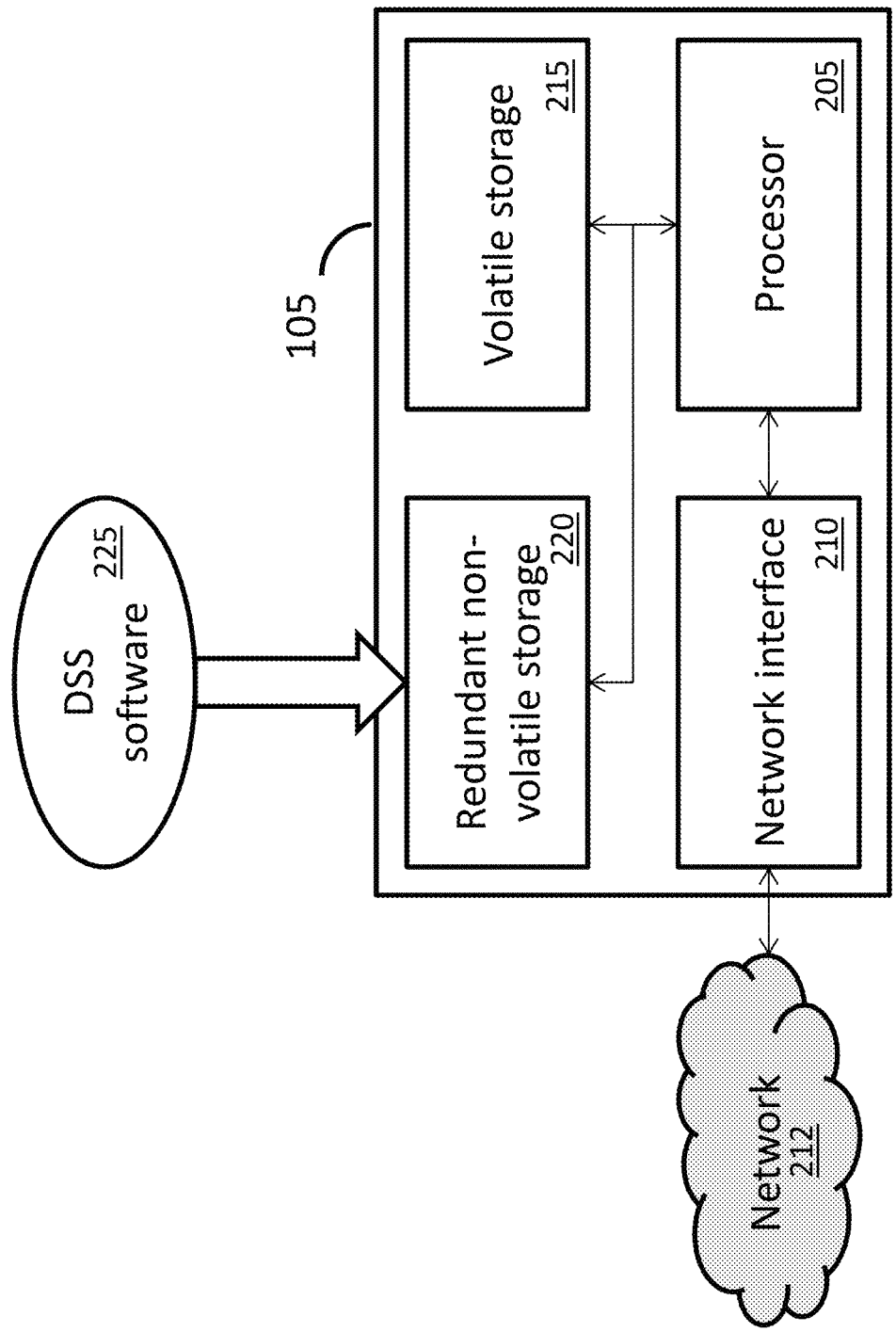
FIG. 2 is a block diagram of a host computing device used in embodiments of the present invention.

FIG. 2 is a block diagram of a host 105 used in embodiments of the present invention. The host 105 includes a processor 205, which uses a network interface 210 to communicate with other members of the DSS system 100 over a computer network 212. The host 105 also includes volatile storage 215, such as memory, and redundant non-volatile storage 220, such as disk. The redundant non-volatile storage 220 may store DSS software code 225 that, when executed, implements the protocols of the DSS system 100. In some embodiments, the redundant non-volatile storage 220 may also store data, whether owned by the host 105 or a renter 110.

Figure 3:
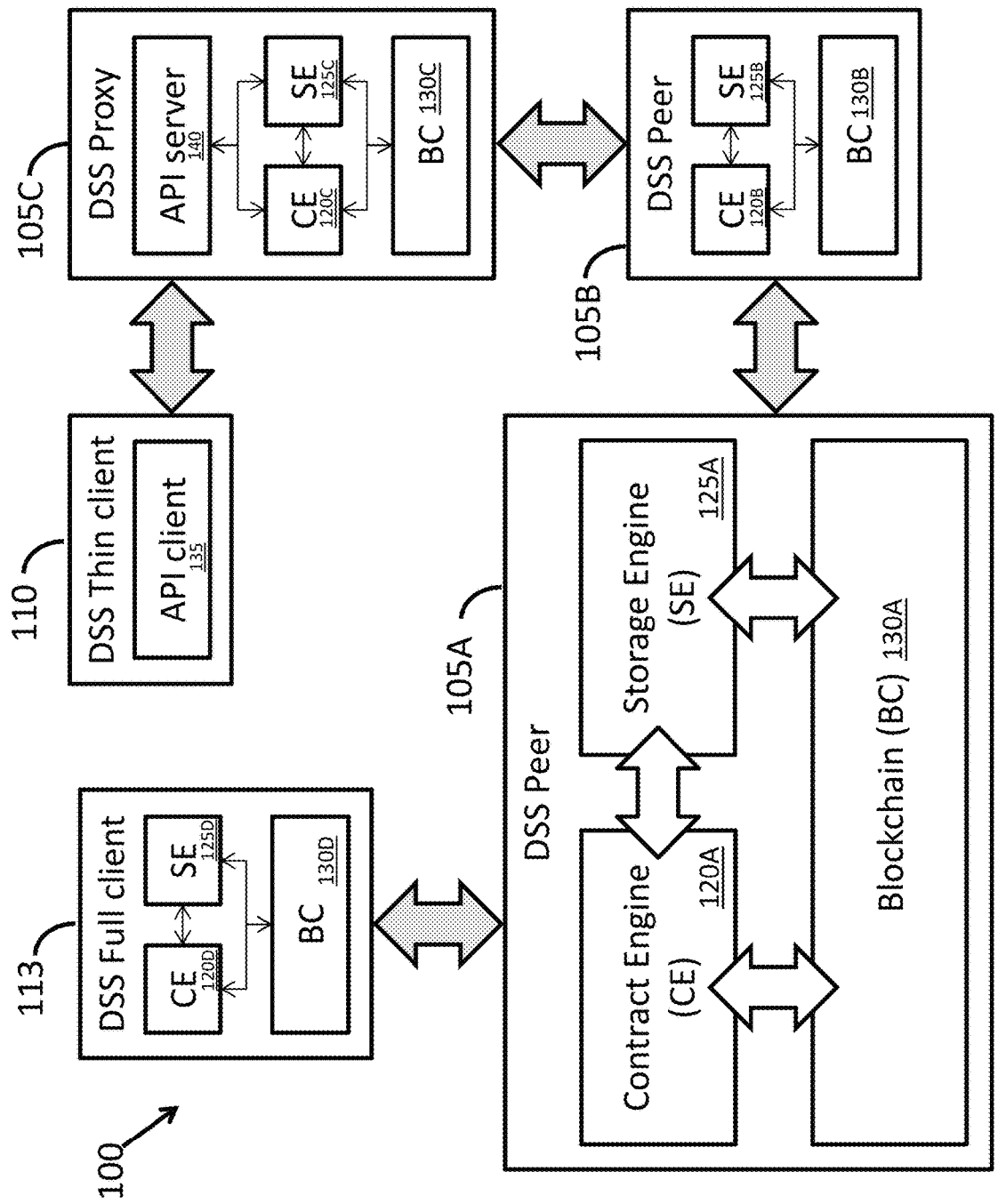
FIG. 3 is a schematic diagram of members of a blockchain-based decentralized storage system communicating over at least one computer network, according to another embodiment of the present invention.

FIG. 3 is a schematic diagram of members (also referred to herein as "nodes") of a blockchain-based decentralized storage system 100 communicating over at least one computer network 212, according to an embodiment of the present invention. The members may include hosts 105 (shown as 105A, 105B, and 105C), renters 110, and sentinels 113. In various embodiments, a member of the DDS system 100 may also be referred to as a "node".

In one embodiment, the DSS system 100 is modeled as an asynchronous distributed system where nodes 105, 110, 113 are coupled over a computer network 212 (in FIG. 2) with no known bounds on processing times and message delays. It is assumed that links in the computer network 212 may fail to deliver messages or may delay messages, duplicate messages, or deliver messages out of order. However, the links in the computer network 212 are presumed to be fair, e.g., if a message is sent infinitely often to a correct member 105, 110, 113 of the DDS system 100, then the message is received infinitely often.

For purposes of this description, a member 105, 110, 113 can be correct or faulty. A correct member 105, 110, 113 follows its specification, while a faulty, or Byzantine, member 105, 110, 113 presents arbitrary behavior. The DSS system 100 allows for a strong adversary that can coordinate faulty members 105, 110, 113, inject spurious messages into the computer network 212, or delay correct members 105, 110, 113 in order to cause the most damage to the Blockchain 130. However, it is presumed that adversaries cannot delay correct members 105, 110, 113 indefinitely.

The DSS system 100 uses cryptographic techniques for authentication and digest calculation. Some embodiments of the DSS system 100 rely on traditional cryptographic methods, such as secure digests, Merkle trees, and symmetric and asymmetric encryption. Adversaries (and Byzantine nodes under their control) are likely to be computationally bound so that they are unable, with very high probability, to subvert the cryptographic techniques used.

It is assumed that at most f members 105, 110, 113 of the DSS system 100 can be Byzantine, and therefore require n=2f+1 members 105, 110, 113 in the agreement subsystem (as explained below).

P denotes the set of members 105, 110, 113 that may join the DSS system 100. The identities of members 105, 110, 113 are established using public-key cryptography. Each member 105, 110, 113 p∈P generates a public/private key pair before joining the DSS system 100 for the first time, and uses the public key to derive its identifier (ID). Given assumptions about cryptographic techniques and computational power of adversaries, these IDs are assumed to be unique and collision-free. The only assumptions made about these members' IDs are that they are unique and collision-free. The member IDs are not required to be sequential, nor do their contents influence the execution of the protocols discussed herein.

A member 105, 110, 113 p may be either online or offline, and the set of online members 105, 110, 113 at time t can be represented by P(t)⊆P. Offline members 105, 110, 113 may join the DSS system 100 at any time. Online members 105, 110, 113 may also leave the DSS 100 at any time, by either halting (voluntarily) or crashing (involuntarily).

Members 105, 110, 113 communicate via message passing in a point-to-point computer network 212. This could be viewed either as having a completely connected communication graph, or by relaying messages among members 105, 110, 113. The DSS system 100 assumes that between any two online members 105, 110, 113, there is a channel that eventually delivers all messages.

System Overview

The Various components of the DSS system 100 (e.g., contract engine 120, storage engine 125, and Blockchain 130) are described in more detail below:

Blockchain 130

In various embodiments, a blockchain [1] is a collaboratively maintained list whose function is to throttle additions of new blocks to the publicly lodged lists of blocks (a blockchain that provides no means to throttle additions of blocks is subject to Sybil attacks, as explained in [1]). In an exemplary embodiment, a single block in the blockchain has the form:

$$b = \langle h, d, p, x \rangle$$

where h is a hash value, d is a nonce, p∈$\mathcal{P}$ is a member in the blockchain replication system, and x is a bit-string.

In the formulas described herein, $\mathcal{H}$ denotes the hash function used to calculate h.

A blockchain consists of a sequence $\mathcal{C} = (b_1, \ldots, b_l)$ of blocks, and a genesis block $b_0$ that is fixed in advance.

The height $|\mathcal{C}|$ of a blockchain is the number of blocks that are in that sequence.

For i≥1, block $b_i = \langle h, d, p, x \rangle$ is said to be legal if:

$h = \mathcal{H}(b_{i-1})$, and $\mathcal{F}(d, \langle h, p \rangle, x) = \text{true}$ That is, if the hash in $b_i$ is obtained from $b_{i-1}$, and that the output of the Proof-of-Stake function $\mathcal{F}$ is true for $b_i$. For a legal block $b_i$, the block $b_{i-1}$ is called the parent of $b_i$, and $b_i$ is a child of $b_{i-1}$. A blockchain is legal if every non-genesis block is legal.

The Proof-of-Stake function $\mathcal{F}$ ensures that new blocks cannot be appended to $\mathcal{C}$ at will. Appending a legal block to $\mathcal{C}$ is called "mining" in Proof-of-Work blockchains, and "minting" in Proof-of-Stake blockchains.

Note that legal blocks together with $b_0$ form a tree rooted at $b_0$ due to the parent/child relation, and a legal blockchain corresponds to a path in the tree starting at the root. In order to provide forward security, it is necessary that once the members agree on a blockchain $\mathcal{C}$, they will never accept a blockchain that does not have $\mathcal{C}$ as a prefix.

Blockchains can be classified as: (a) coins or cryptocurrencies, which are used as digital currencies; (b) utility tokens, which are services or units of services that can be purchased; and (c) tokenized securities, which represent shares of a business. Various embodiments of DSS system 100 can be classified as a utility token with which renters 110 can rent storage from hosts 105 in a decentralized fashion on the DSS system 100.

Proof-of-Work vs. Proof-of-Stake

Embodiments of the DSS system 100 differ from traditional blockchains by using a Proof-of-Stake (PoS) instead of Proof-of-Work (PoW) consensus.

PoW mechanisms [2] are successful in limiting the rate at which new blocks can join a blockchain by employing computational puzzles that require an adjustable amount of effort to solve, called difficulty, which cannot be scaled at will. This approach has led to an ever increasing "arms race" in which more and more computational power has been dedicated to find a nonce d for x that satisfies $\mathcal{F}$.

For example, according to a Bitcoin news site [3] obtaining a single bitcoin through PoW mining in 2014 required 240 kWh—which translates to burning 15.9 gallons of gasoline, without ethanol. Under current hash rates, the value has increased to 811 gallons of gasoline per bitcoin, assuming that only state-of-the-art custom-designed mining hardware is used, and that all electricity is generated using the national average for $CO_2$ emissions per MWh in the USA.

Besides the environmental impact, PoW is likely to suffer from "Tragedy of the Commons" attacks [4], such as miners leaving once the block reward and transaction fees are no longer enough to cover their operating costs. A healthy PoW blockchain requires a multitude of miners, and the long-term prospects of a blockchain like Bitcoin's seems to point towards centralization and concentration of hashing power in the hands of the few entities that will be able to operate at just modest profit.

In the DSS system 100, the system 100 attempts to ensure that the blockchain will have a multitude of participants by allowing all members 105, 110, 113 to participate in the process, including, in one exemplary embodiment, the existing deployed base of Drobo Network-Attached Storage (NAS) devices. Unfortunately, PoW blockchains perform very poorly on non-specialized hardware, such as CPUs. In fact, it is estimated that the aggregate hashing capacity of all NAS devices in the world could be easily overtaken by a few dozen top-of-the-line GPUs. In other words, PoW is not an adequate solution for a DSS system 100 that has to integrate devices of all sizes and hashing capabilities.

Therefore, in exemplary embodiments, members 105, 110, 113 participate in the creation of the blockchain by using a Proof-of-Stake (PoS) consensus. In PoS blockchains, the member 105, 110, 113 that will be responsible for minting the next block is chosen in a pseudo-random but deterministic way, and the chance that a given member 105, 110, 113 is chosen depends on how much DSS wealth they are willing to stake to take that role [5].

The pseudo-random nature of PoS blockchains works to their advantage, since it can lead to significant reductions in confirmation times [6]. Instead of the traditional "one block each 10 minutes" rate defined by Bitcoin, a PoS blockchain can operate at a rate of one block per minute [7] [5]. In fact, some PoS blockchains claim to mint a new block each 15 seconds [7].

Generally speaking, in PoS blockchains, all the wealth (typically referred to as "coins") is created with the genesis block, and the total number of coins never changes afterwards (e.g., Nxt) [8]. Therefore, in the common implementation of PoS, there are no block rewards as in Bitcoin. The minters take only the transaction fees. Some PoS blockchains (e.g., Peercoin, Blackcoin, Gridcoin) introduce an inflationary model to further incentivize minting. These inflationary models are not necessary in a utility token such as DSS system 100.

The shortcomings of PoS are well-known and understood. They can be summarized as such: (1) a majority holder, i.e, someone that holds more than 50% of the coins, will eventually mint all blocks [9]; (2) the bootstrapping problem states new members 105, 110, 113 have no way to figure out by themselves which blockchain presented to them is the right one, since it is computationally feasible to fork the entire blockchain from the genesis block [10]; and (3) the threat of "nothing-at-stake" attacks, in which minters actively follow every single chain fork in the hopes of increasing their chance of being awarded a block [11], therefore making it harder for the blockchain to reach a consensus.

The first shortcoming is addressed in detail in [6], which concludes that the odds of such a concentration of wealth are very low in a normal blockchain market. For example, the DSS operator may be granted a limited number of the genesis coins (e.g., 20%) vested over time in order to limit its own influence over the blockchain.

In some embodiments, the bootstrapping problem may be circumvented by DSS system 100 by issuing periodic checkpoints for the blockchain. Since DSS system 100 is a utility token, using one of the major stakeholders is justifiable on the same general principles that justify using a Proof-of-Stake. Furthermore, in an exemplary embodiment, as a contingency plan, a Foundation will be created and granted a limited number of the genesis coins (e.g., 10%) vested over time to take over DSS system 100 checkpointing in addition to its philanthropic activities.

In some embodiments, "nothing-at-stake" attacks can be mitigated by fine-tuning the minter selection algorithm. Thus, a completely fair algorithm, that is, one that is based only on the wealth available for each member 105, 110, 113 in the blockchain, provides no advantage for minters to support all forks. Furthermore, DSS 100 preferably will implement extra steps that can be taken to penalize identities that offer blocks on multiple forks.

Contract Engine 120

In DSS system 100, the Blockchain 130 is used to lodge storage contracts, and other contracts (including various parameters of the contracts) related to that storage. From a higher abstraction level, the Blockchain 130 in DSS system 100 behaves more like a notarial service than a simple ledger, by keeping a permanent record of all contracts related to storage in the DSS system 100.

The contract engine 120 defines, enforces, and settles contracts on the Blockchain 130. The contract engine 120 runs in members 105, 110, 113 of the DDS system 100 side-by-side with the Blockchain 130 to help validate incoming transactions (e.g., contracts, statements), first by ensuring that the pre-conditions necessary for a transaction to be included in the Blockchain 130 are fulfilled, and second by verifying claims made by other members 105, 110, 113.

The transactions in DSS system 100 are built on top of Byzantine fault-tolerant (BFT) protocols that define the transactions that will be included in the Blockchain 139. The DSS system 100 preferably follows three major guidelines for these protocols:

correct behavior has to be incentivized, incorrect behavior has to be punished, and when bad behavior cannot be proved, at best it should not have any benefits.

In traditional BFT systems, it is very hard to enforce these guidelines, since usually it is very hard to attach incentives or penalties to behavior [12].

In contrast, in DSS 100, financial rewards and penalties can be established for good or bad behavior, respectively. Provable good behavior can be rewarded, provable bad behavior can be penalized, and even when the system cannot prove either way, there is no financial incentive to behave badly.

Exemplary protocols that are supported by the contract engine 120 are discussed below.

Fund Transfer

The "transfer funds" protocol (XFER) allows coins to be transferred from the wallet of one member 105, 110, 113 to another.

Inputs. The identity of a member 105, 110, 113 that wishes to transfer funds (i.e., the sender) generates a signed statement containing the amount of coins and the identity of the member 105, 110, 113 that will receive the funds (i.e., receiver).

Protocol. The sender submits the signed statement to the Blockchain 130. The contract engine 120 running on the next minter of the Blockchain 130 checks that the sender has sufficient funds. If so, the minter adds the signed statement to the Blockchain 130. As a result, the funds are considered to be in the receiver's wallet.

Security analysis. Forgery of a signed statement is considered infeasible by definition, which ensures both forgery prevention and non-repudiation of XFER transactions.

Join the Network as a Storage Provider

A host 105 can announce itself as a storage provider to the rest of the Blockchain 130 using the "join network" protocol (JOIN). Renters 110 that are looking for storage providers do not need to announce themselves. Instead, a renter 110 can scan the Blockchain 130 for JOIN statements to find hosts 105 who have offered to provide storage for rent.

Inputs. The host 105 that wishes to become a storage provider generates a signed statement containing:

Capacity available (e.g., in GiB)
Maximum contract duration (e.g., in days)
Minimum storage price (e.g., in DBC/TB/month)
Minimum upload bandwidth price (e.g., in DBC/TB)
Minimum download bandwidth price (e.g., in DBC/TB)
Total collateral available (e.g., in DBC)
Minimum verification interval (e.g., in hours)
Verification validity (e.g., in hours)
Accepting new contracts (e.g., yes or no)

Protocol. The host 105 submits the signed statement to the Blockchain 130. In some embodiments, the contract engine 120 executing on the next minter of the Blockchain 130 checks that the host 105 has sufficient funds to cover the announced total collateral, and that the verification schedule is reasonable (i.e., not too frequent), among any other criteria. The minter adds a statement to the Blockchain 130 to remove the collateral from the host's 105 wallet, and the funds will be reserved for fulfilling storage contracts. The verification schedule indicates how often a host 105 is willing to submit proof of storage for any given data, and the verification validity indicates the amount of time the host 105 may take to submit this proof to the Blockchain 130. Once the JOIN statement is added to the Blockchain 130, if the host 105 has signaled that it is accepting new contracts, then renters 110 may engage in storage contract negotiations with the host 105.

The host 105 can update its data (e.g., available capacity, prices, status) by issuing a new signed JOIN statement, and submitting the updated JOIN statement to the Blockchain 130. As a result, when searching for a storage provider, prospective renters 110 consider only the most recent JOIN statement on the Blockchain 130 for a given host 105, to be informed of the host's 105 most current information.

When a host 105 issues an updated JOIN statement, the contract engine 120 executing on the next minter for the Blockchain 130 compares the stated available capacity of host 105 and new total collateral against the host's previous JOIN statement and capacity and collateral allocated to existing storage contracts, to validate the updated JOIN statement. In some embodiments, the Blockchain 130 minter may decline to add the updated JOIN statement to the Blockchain 130, if the statement cannot be validated.

In various embodiments, hosts 105 must update their "accepting new contracts" status to "no" in order to exit from the DSS system 100. Changing that status signals that renters 110 looking for available storage should not contact the host 105 to initiate negotiations for storage contracts. Nevertheless, a host 105 must honor its existing storage contracts until the storage contracts are settled, even if the host 105 announces that it is no longer accepting new storage contracts. Failure to honor existing contracts will result in loss of collateral from these contracts.

Security analysis. Forgery of a signed statement is considered infeasible by definition, which ensures both forgery prevention and non-repudiation of JOIN statements.

Upload a File

In contrast to conventional PUT protocols, the upload protocol (PUT) according to embodiments of the invention minimizes the risk of non-compliance by hosts 105 and renters 110, and enables parties to storage contracts to seek compensation for breaches of storage contracts.

The upload protocol (PUT) defines how a new unit of data, such as a file, is added by a renter 110 to a host 105 on the DSS system 100 for storage. The PUT protocol includes three phases: finding potential hosts 105, negotiating contracts with these hosts 105, and submitting proof that the data was uploaded to the hosts 105.

Inputs. For the second phase, the renter 110 that wishes to upload data generates a storage contract proposal containing:

Size of data
Root of Merkle tree
Start date and time (ISO 8601)
End date and time (ISO 8601)
Renter-provided metadata
Total value for data storage (TS)
Total value for data upload (TU)
Total contract collateral (TC)
Verification interval
Verification validity
Offer validity (in hours)

(It will be understood that in this embodiment the "contract proposal" is implemented as a message formatted to contain the content set forth above, although the specific message content will depend on the specific implementation.) The storage contract proposal becomes a contract when accepted via an acceptance message from the host. In this sense, the storage contract must be signed by both host and renter.

TS is defined as:

$$TS = size \times duration \times (DBC/TB/month)$$

TU is defined as:

$$TU = size \times (DBC/TB)$$

Collateral should be equal to the value of the storage. Therefore TC is defined as:

$$TC = TS$$

For the third phase, the renter 110 and host 105 sign a statement containing:

The contract ID, or "CID", (e.g., a hash of the signed statement from the second phase)
A checksum of the uploaded data, generated by the host 105

This statement serves as proof that the data from the renter 110 was uploaded and successfully stored on the host 105.

Protocol. The first phase is performed by the renter 110 (for the purpose of this example, only members 105, 110, 113 that serve as minters for the Blockchain 130 are considered, although in other embodiments, "thin" peers, i.e., thin client computing devices that delegate the Blockchain 130 handling to a third party, and concern themselves with just uploading data to a given host 105, may perform these tasks) by scanning the Blockchain for JOIN statements to look for possible hosts 105. During this scan, the renter 110 filters the hosts 105 according to its requirements (e.g., capacity available, costs, verification interval, etc.), and obtains a list of potential hosts 105.

The second phase is a direct negotiation with potential hosts 105, in which the specific details of a given storage contract are defined. The renter 110 sends a storage contract proposal to the host 105, which the host 105 is free to accept or reject. If the storage contract proposal is rejected, in some embodiments, the host 105 may indicate the reason—for example, that the storage contract validity is too small or too large. If the storage contract proposal is accepted, the host 105 signs and return the storage contract to the renter 110. The renter 110 then also signs the storage contract, and submits the storage contract with both signatures to the Blockchain 130. The contract engine 120 on the next minter for the Blockchain 130 validates the storage contract. For example, the minter may compare the funds available in the renter's 110 wallet against the rent stated in the storage contract, or the funds available in the host's 105 wallet against the collateral in the storage contract. In further examples, the minter may compare the storage requirements of the contract against available capacity in the host's 105 most recent JOIN statement and capacity already accounted for in existing storage contracts. Once the storage contract is included in the Blockchain 130, the storage contract becomes valid.

In the third phase, renter 110 and host 105 must complete the data upload before the storage contract expires. The expiration date is defined by the timestamp of the block that includes the storage contract or the storage contract's start date (whichever is later), plus the offer validity. Once a storage contract expires, all data related to the storage contract (including partial uploads) may be discarded. Thus, the renter 110 and host 105 must agree on the amount of acceptable time to upload the amount of data specified in the storage contract, under pain of wasting bandwidth without compensation.

Once the upload is completed, the host 105 computes a checksum of all the uploaded data, signs the checksum, and sends the signed checksum back to the renter 110. The renter 110 verifies that the received checksum matches the checksum of the data that the renter 110 wants stored, adds its signature to the signed checksum, and submits the checksum with both signatures to the Blockchain 130. Once that signed checksum is included in the Blockchain 130, the host 105 must perform the verification schedule in the storage contract.

If the host 105 fails to fulfill its obligations to upload/store data, a proportional amount of collateral is given to the renter 110 as compensation.

Figure 4:
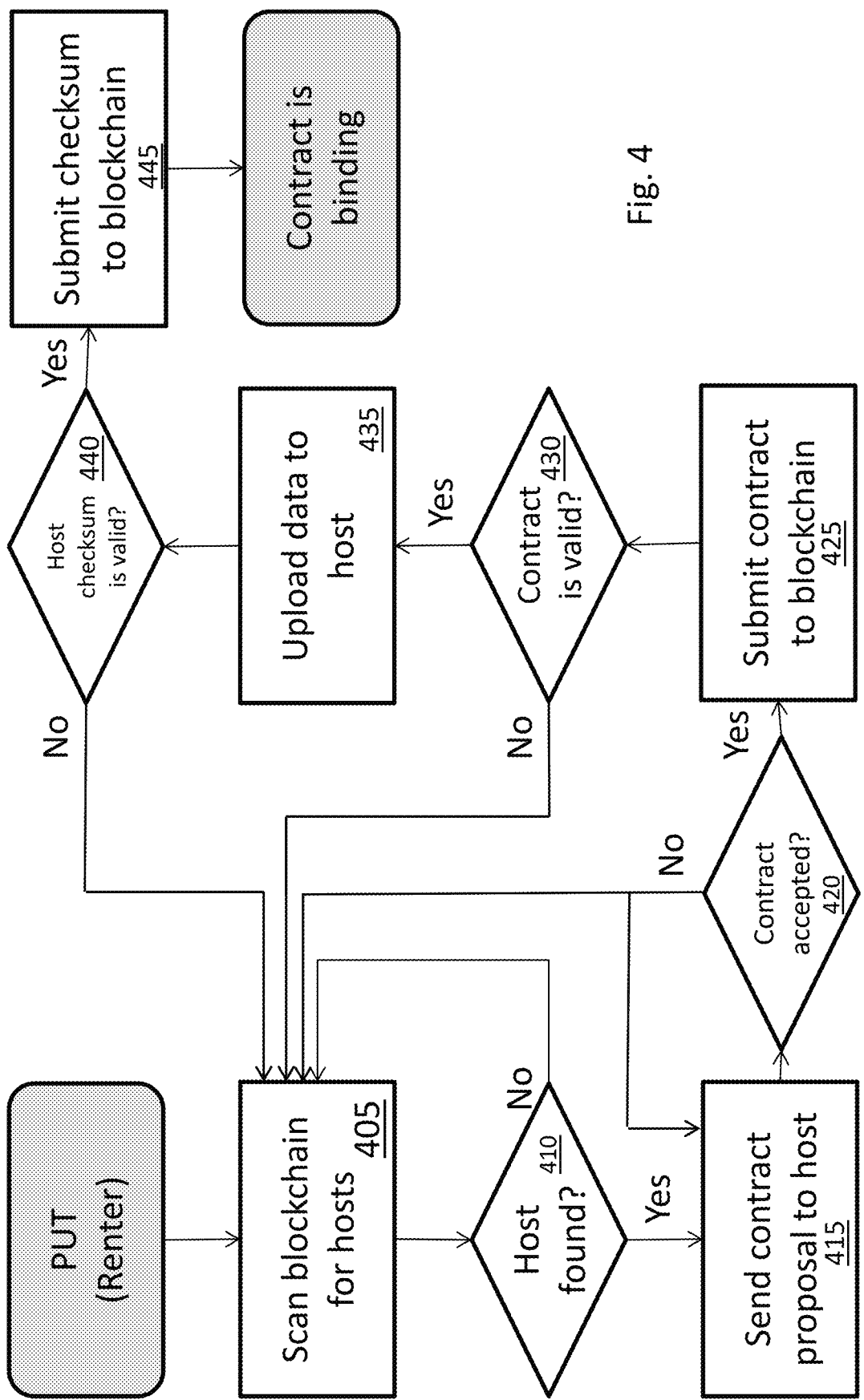
FIG. 4 is a flow diagram of computer processes associated with a PUT protocol, as followed by a renter, to store data on a host, according to an embodiment of the present invention.

FIG. 4 is a flow diagram of computer processes associated with a PUT protocol, as followed by a renter 110, to store data on a host 105, according to an embodiment of the present invention. The renter 110 scans the Blockchain 130 for hosts 105 (process 405). For example, the renter 110 may scan the Blockchain 130 for JOIN statements. As described above, each JOIN statement describes the storage offerings of a host 105 willing to be a storage provider. If the renter 110 does not find a JOIN statement (process 410), the renter 110 continues to scan the Blockchain 130 until such a statement is found. The renter 110 may compare the JOIN statements of hosts 105 against the renter's own requirements, to select a host 105. In some embodiments, the renter 110 selects the first host 105 whose terms in its JOIN statement fulfill the renter's 110 requirements. In other embodiments, the renter 110 waits until the renter 110 collects multiple JOIN statements. The renter 110 may compare the terms of these statements to select a host 105 with the most advantageous terms (e.g., lowest cost, shortest verification interval).

After the renter 110 selects a host 105, the renter 110 prepares and sends a storage contract proposal to the selected host 105 (process 415). The storage contract proposal may include any of the terms described above as an input to the PUT protocol. The renter 110 waits for a response from the host 105 (process 420). The renter 110 may receive a rejection of its storage contract proposal, which may include a reason for the rejection. The renter 110 may return to scanning the Blockchain for JOIN statements to find another host 105 (process 405). Alternatively, the renter 110 may revise its storage contract proposal to account for the host's 105 reason and send the updated storage contract proposal to the host 105 (process 415). In this manner, the renter 110 may continue adjusting its storage contract proposal until the renter 110 receives an acceptance from the host 105, by way of a signed storage contract. Then, the renter 110 signs the received storage contract and submits it to the Blockchain 130 (process 425).

The renter 110 receives confirmation from a Blockchain 130 minter that the storage contract has been added to the Blockchain 130 (process 430). By virtue of such addition, the storage contract becomes binding. The renter 110 uploads data to the host 105 for storage (process 435). In some embodiments, the renter 110 divides its data into chunks, and sends the host 105 one chunk at a time. The renter 110 computes a checksum of all the transmitted data. The renter 110 receives a signed checksum from the host 105, to signify that the host 105 has received and stored the renter's 110 data (process 440). A match between the host's 105 checksum and the renter's 110 checksum indicates that the host 105 has received and stored the correct data. The renter 110 adds its signature to the signed checksum and submits the signed checksum to the Blockchain 130 (process 445).

Figure 5:
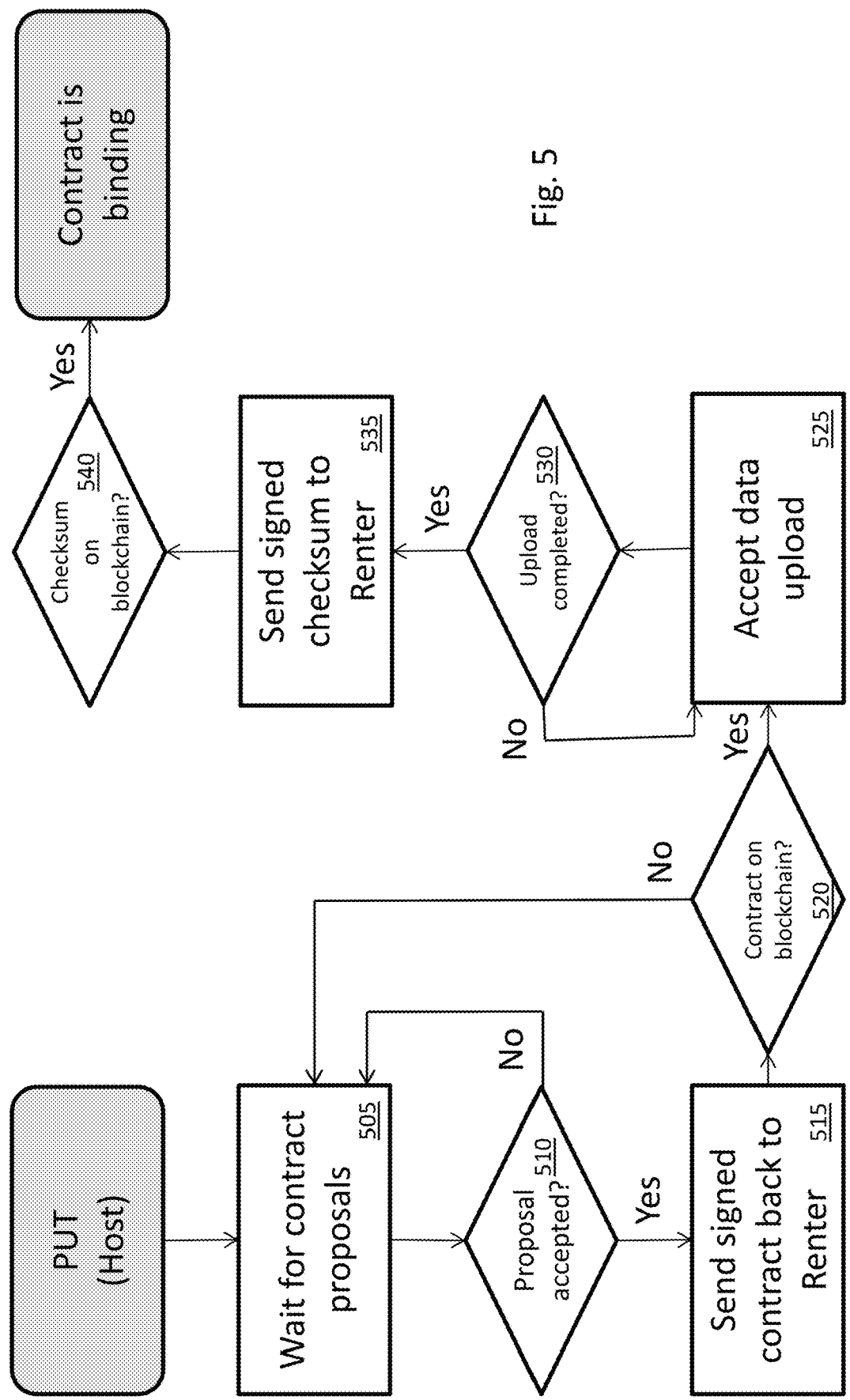
FIG. 5 is a flow diagram of computer processes associated with the PUT protocol, as followed by the host of FIG. 4, to store data on the host, according to an embodiment of the present invention.

FIG. 5 is a flow diagram of computer processes associated with the PUT protocol, as followed by a host 105, to store data on the host 105, according to an embodiment of the present invention. A host 105 that has submitted a JOIN statement to the Blockchain 130 waits for storage contracts proposals from prospective renters 110 (process 505). When the host 105 receives a storage contract proposal, the host 105 reviews the terms and decides whether to accept the proposal (process 510). If the terms are unsatisfactory, the host 105 sends a rejection, with or without a reason, to the renter 110, and continues to wait for additional storage contracts proposals (process 505). Once the host 105 receives a satisfactory storage contract proposal, the host 105 signs and returns the storage contract proposal to the renter 110 (process 515). The host 105 waits to receive confirmation from a Blockchain 130 minter that the storage contract has been added to the Blockchain 130 (process 520). The host 105 accepts from the renter 110 data to be stored (process 525). After the host 105 finishes storing the data (process 530), the host 105 computes a checksum of the stored data, signs the checksum, and submits the signed checksum to the renter 110 (process 535). The host 105 waits to receive confirmation from a Blockchain 130 minter that the signed checksum has been added to the Blockchain 130 (process 540), upon which the host 105 performs the remaining terms of the contract (e.g., verification).

Figure 6:
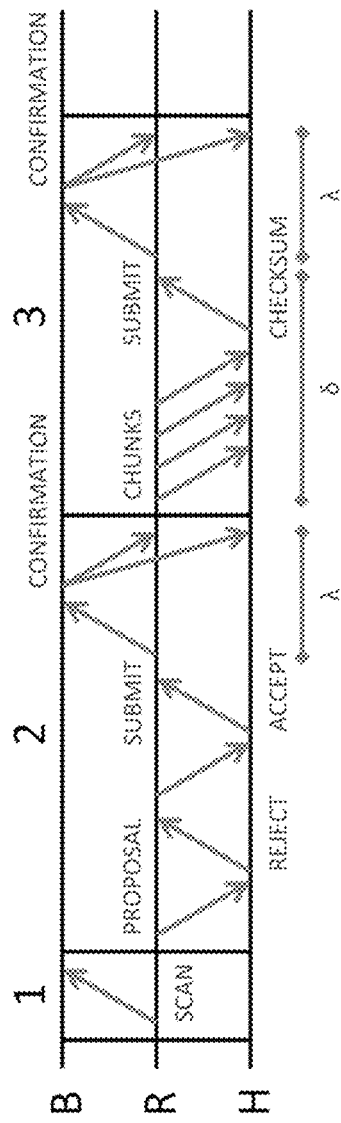
FIG. 6 depicts a set of timelines representing communications, performed during the PUT protocol, by the renter, the host, and the Blockchain, according to an embodiment of the present invention.

FIG. 6 depicts a set of timelines representing communications, performed during the PUT protocol, by the renter (represented by "R"), the host (represented by "H"), and the Blockchain (represented by "B"), according to an embodiment of the present invention. The timeline depicts the three phases of the PUT protocol, as described above. During the first phase, the renter 110 scans the Blockchain 130 for prospective hosts 105. During the second phase, the renter 110 and a selected host 105 negotiate a storage contract. The renter 110 may send storage contract proposals with different terms until the host 105 accepts a proposal, at which point the renter 110 submits a storage contract signed by both parties to the Blockchain 130. The Blockchain 130 minter verifies the storage contract, according to the processes described herein, adds the storage contract to the Blockchain 130, and sends confirmation of this addition to the renter 110 and host 105.

In phase three, the renter 110 transmits chunks of data to the host 105 for storage. The host 105 determines a checksum for the data, signs the checksum, and sends the signed checksum to the renter 110. The renter 110 compares the checksum against its own computed checksum, and if the values match, the renter 110 adds its signature to the checksum and submits the checksum to the Blockchain 130. The Blockchain 130 minter sends confirmation to the renter 110 and host 105 that the signed checksum has been added to the Blockchain 130.

Security analysis. Generally speaking, it is desirable to prevent two things: (a) a host 105 that just throws data out as soon as it receives it, and (b) a renter 110 that tries to scam a host 105 out of its collateral by starting a contract but never uploading the data. Advantageously, embodiments of the PUT protocol limit the number of ways in which either renter 110 or host 105 can misbehave.

First, the renter 110 may not submit the signed contract to the Blockchain 130. Since storage contracts are not binding until the data upload is completed, and hosts 105 are not required to pre-allocate resources, there is no financial loss for the host 105. Furthermore, the host 105 may apply individual penalties against that renter 110, such as increasing prices in future contracts, temporarily blocking the renter 110, or even blacklisting the renter 110 completely.

Second, the renter 110 may refuse to send the data. Once again, since contracts are not binding until the data upload is completed, and hosts 105 are not required to pre-allocate resources, there is no long-term financial loss for the host 105 as the contract will eventually expire. Also, in this case, the host 105 may apply individual penalties against that renter 110.

It should be noted that off-chain reputation systems can be used by renters 110 in their host selection phase (e.g., to report bad host behavior) and/or by hosts 105 (e.g., to report bad renter behavior).

Third, the host 105 may not send a signed checksum. In this case, the renter's 110 bandwidth was wasted. However, since this action wastes the host's 105 bandwidth, there is no financial incentive for the host 105 to stop the protocol midway. The renter 110 may apply individual penalties against that host 105, such as increasing the amount of collateral needed in future storage contracts, temporarily blocking the host 105, or even blacklisting the host 105 completely.

Fourth, the host 105 may send a signed bad checksum. Here the renter 110 can prove that the host 105 is misbehaving, by including a proof based on the Merkle root that was included in the accepted storage contract. With this proof, the renter 110 can be awarded the collateral in the storage contract, since the host 105 failed to provide evidence that it received and stored all of the renter's 110 data.

Finally, the renter 110 may not submit the signed checksum to the Blockchain 130. In this case the host's 105 bandwidth was wasted, but so was the renter's 110—once again there is no incentive to misbehave. Since the host 105 may discard all data related to expired contracts, there are no long-term losses. Here again, the host 105 may apply individual penalties against the renter 110.

Scalability analysis. Once the Blockchain 130 has been replicated, the first phase of the PUT protocol can be analogized to an offline indexing operation. The first phase can be resolved locally, and as such, the first phase does not affect the scalability of the Blockchain 130. The second phase is performed in a peer-to-peer and off-chain fashion, up to the point that a storage contract proposal is accepted. At that point, there is one transaction that requires on-chain interaction. The third phase is performed also in a peer-to-peer off-chain fashion, since data is uploaded directly from the renter 110 to host 105. When the data upload is completed, there is one additional on-chain interaction.

In various embodiments, the PUT protocol is a Blockchain-backed two-phase commit (2PC), and as such, scales well as long as there is no or low contention. Contention, in this context, means several renters 110 trying to acquire collateral from the same host 105 at the same time, and having their storage contract proposals be rejected by the contract engines 120 on minters once the renters 110 simultaneously submit their storage contract proposals to the Blockchain 130. This can be mitigated by adding some randomization to the host selection in the first phase, thus preventing all renters 110 from deterministically selecting the same set of hosts 105 at the same time.

In some embodiments, the PUT protocol only ensures that the data from a renter 110 was correctly uploaded to a host 105, and not that the host 105 will maintain the data for the duration of the storage contract.

Optimizations. In the case of the DSS system 100, the most important metrics are bandwidth and latency. If $\lambda$ is the delay between submitting a storage contract to the Blockchain 130 and receiving confirmation that the storage contract has been added to the Blockchain 130, and $\delta$ is the time needed to upload the file, then the latency $\Delta PUT$ of a non-optimized PUT is:

$$\Delta_{PUT} = 2 \times \lambda + \delta$$

That $2\lambda$ latency is necessary if the host 105 does not trust the renter 110.

If the hosts 105 want to operate under the assumption that a renter 110 is not Byzantine (which is statistically true), the hosts 105 can start the data upload before receiving confirmation that the signed storage contract has been added to the Blockchain 130. Assuming that the data upload takes longer than the blockchain delay, i.e., $\delta > \lambda$, then the effective host PUT latency $\Delta_{PUT_{eh}}$ is:

$$\Delta_{PUT_{eh}} = \lambda + \delta$$

From the point of view of the renter 110, the effective PUT latency is $\Delta_{PUT_{er}} = \delta = \delta$ if the renter 110 assumes that the host 105 is honest (which is, once again, statistically true), since the renter 110 does not need to wait to receive confirmation that the signed checksum has been added to the Blockchain 130. As a result, under the optimized PUT protocol, a DSS data upload requires a comparable amount of time as a traditional client-server upload.

Figure 7:
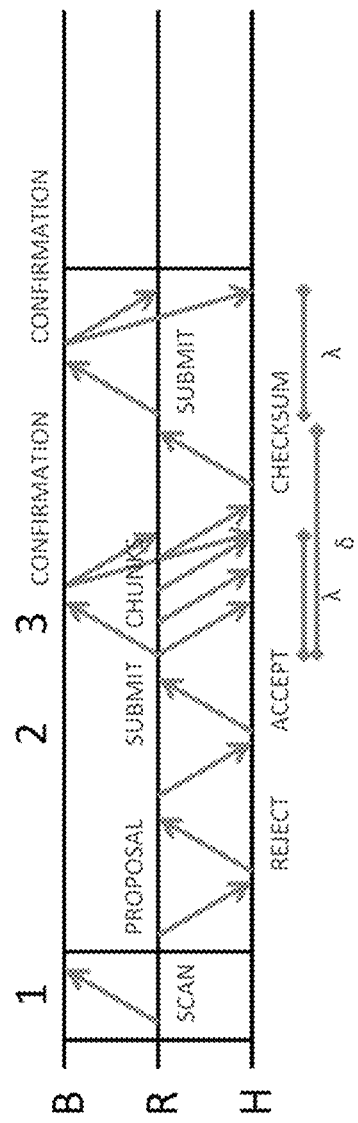
FIG. 7 depicts a set of timelines representing communications, performed during an optimized version of the PUT protocol, by the renter, the host, and the Blockchain, according to an embodiment of the present invention.

FIG. 7 depicts a set of timelines representing communications, performed during an optimized version of the PUT protocol, by the renter 110, the host 105, and the Blockchain 130, according to one embodiment of the present invention. The timeline replicates FIG. 6, except that the renter 110 begins sending data to the host 105 shortly after submitting the signed storage contract to the Blockchain 130, instead of waiting for confirmation that the signed storage contract has been added to the Blockchain 130.

It is important to notice that these optimizations do not compromise the BFT properties of the PUT protocol. For the host 105, the worst that can happen when using the optimized version is the fifth case presented in the security analysis, where the renter 110 does not submit the signed checksum to the Blockchain 130, causing the host 105 to waste its bandwidth (storage space will be reclaimed as soon as the storage contract expires). For the renter 110, the worst that can happen when using the optimized version are the third and fourth cases, where the host 105 does not return the signed checksum after the data upload. Once again, the only thing lost is the upload bandwidth of the renter 110.

Renew a Storage Contract (i.e., a PUT Contract)

The "renew contract" protocol (EXT) allows renters 110 to extend the duration of an existing storage contract with a host 105 (i.e., a PUT contract). The EXT protocol requires a direct negotiation with the host 105 to define prices for the storage contract extension, as well as provide funds and collateral for the extension. Advantageously, the EXT protocol leverages existing PUT controls to enable their efficient and safe renegotiation.

Inputs. The renter 110 generates an extension contract proposal containing:
  PUT contract ID (CID)
  Start date and time (ISO 8601)
  End date and time (ISO 8601)
  Total value for data storage (TS)
  Total contract collateral (TC)
  Minimum verification interval (in minutes)
  Verification validity (in minutes)

This extension contract must be signed by both host and renter.

TS, TU, and TC are calculated the same way as in the PUT protocol.

Protocol. The renter 110 contacts the host 105 directly to negotiate the duration and prices before a storage contract expires. In various embodiments, the storage contract may be an existing PUT contract, or the most recent EXT contract that extends a previous PUT contract. A host 105 may refuse to extend a storage contract, even if the host 105 has set its "accepting new contracts" status to "on". If the extension contract proposal is rejected, the host 105 may indicate the reason (e.g., the verification interval is too small or too large). If the extension contract proposal is accepted, the host 105 signs and returns the extension contract to the renter 110.

The renter 110 then adds its signature to the signed extension contract, and submits the contract to the Blockchain 130. The contract engine 120 of the next Blockchain 130 minter validates the storage contract. For example, the contract engine 120 may check that the start date of the extension contract matches the end date of the existing storage contract. Once the extension contract has been added to the Blockchain 130, the extension contract becomes valid and the host 105 is obligated to abide by the verification schedule.

Figure 8:
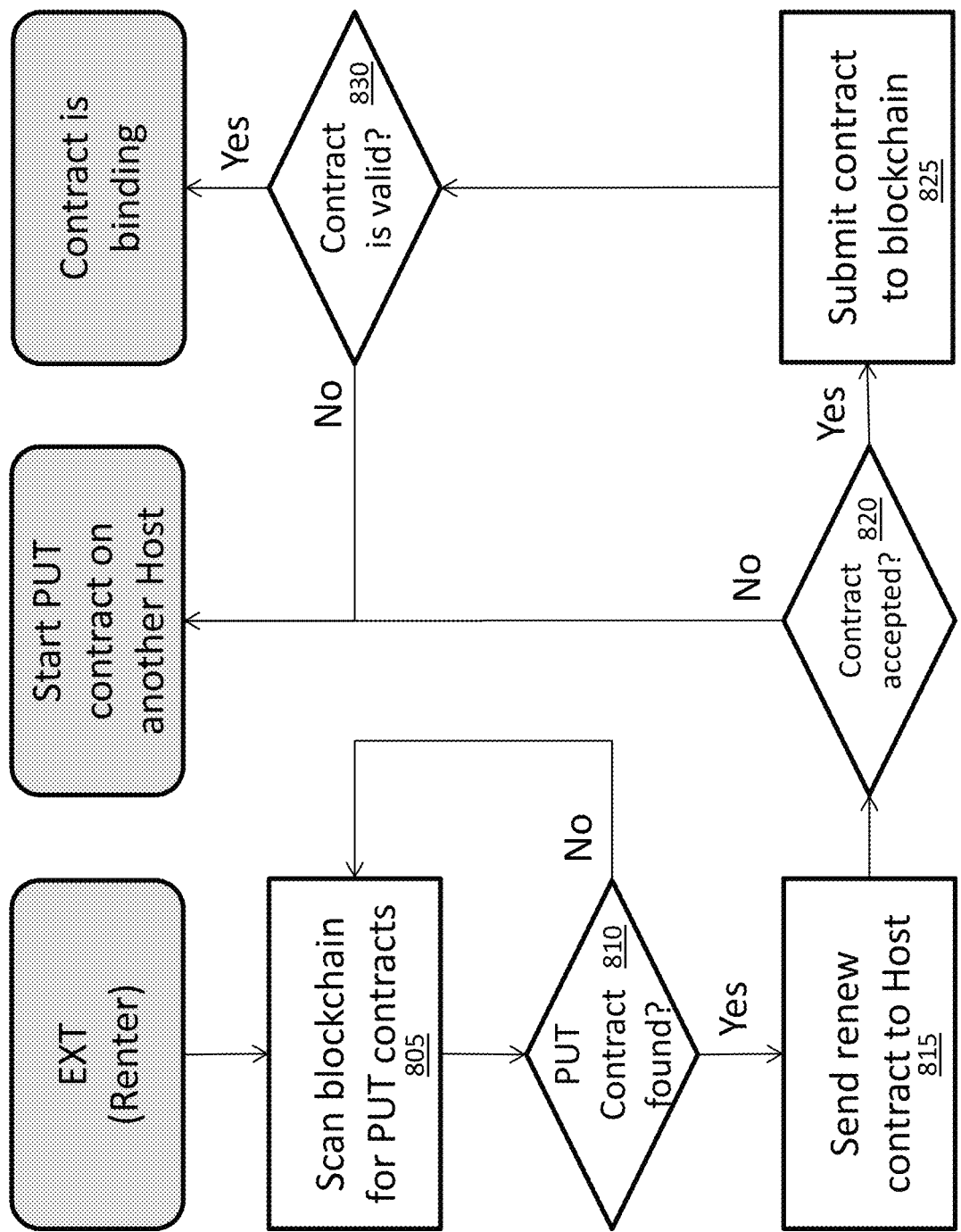
FIG. 8 is a flow diagram of computer processes associated with an EXT protocol, as followed by a renter, to extend a previously executed storage contract, according to an embodiment of the present invention.

FIG. 8 is a flow diagram of computer processes associated with an EXT protocol, as followed by a renter 110, to extend a previously executed storage contract, according to an embodiment of the present invention. The renter 110 scans the Blockchain 130 for the block corresponding to an existing storage contract (a PUT contract, or the most recent EXT contract) (process 805). If the renter 110 fails to find the desired block, the renter 110 continues scanning the Blockchain (process 805). If the renter 110 finds the storage contract (process 810), the renter 110 sends a request to the host 105 to renew the storage contract (process 815). In some embodiments, the renter 110 prepares an extension contract proposal that identifies the storage contract currently in force. The extension contract proposal may include any of the terms described as an input to the EXT protocol. The renter 110 waits for a response from the host 105. If the renter 110 receives a rejection, the renter 110 may return to scanning the Blockchain 130 for other prospective hosts 105. If the renter 110 receives a signed extension contract from the host 105 (process 820), the renter 110 signs and sends the extension contract to the Blockchain 130 (process 825). The renter 110 waits to receive confirmation from a Blockchain 130 minter that the extension contract has been added to the Blockchain 130 (process 830), by virtue of which the extension contract becomes binding.

Figure 9:
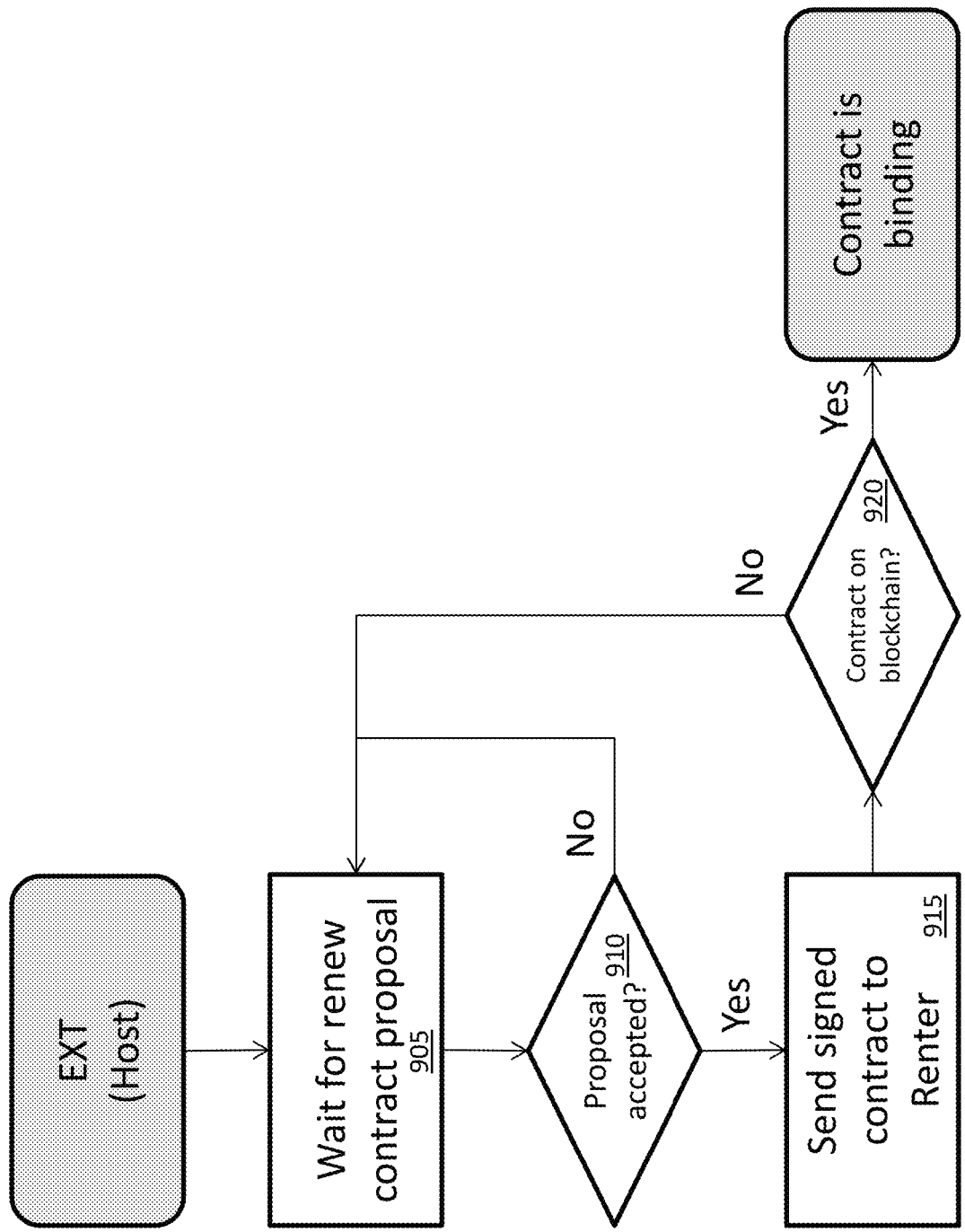
FIG. 9 is a flow diagram of computer processes associated with the EXT protocol, as followed by the host, to extend a previously executed storage contract, according to an embodiment of the present invention.

FIG. 9 is a flow diagram of computer processes associated with the EXT protocol, as followed by a host, to extend a previously executed storage contract, according to an embodiment of the present invention. The host 105 waits for extension contract proposals from existing renters 110 (process 905). When the host 105 receives an extension contract proposal, the host 105 determines whether to accept or reject (process 910). In some embodiments, the host 105 cannot meet the terms of the extension contract (e.g., the requested amount of storage exceeds its remaining storage capacity, or the host 105 is not accepting new contracts), in which case the host 105 sends a rejection or fails to respond to the renter 110. If the host 105 wishes to accept an extension contract proposal, the host 105 signs and returns the extension contract to the renter 110 (process 915). The host 105 waits until the host 105 receives confirmation from a Blockchain 130 minter that the extension contract has been added to the Blockchain 130 (process 920).

Security analysis. Forgery of a signed statement is considered infeasible by definition, which ensures both forgery prevention and non-repudiation of EXT transactions.

Scalability analysis. A storage contract renewal is a single on-chain interaction, that should happen once within the duration of the previous PUT or EXT contract.

Scheduled Verification

Renters 110 can leverage the DSS system 100 to ensure that their PUT and EXT contracts are being respected. The verification fields in the PUT and EXT contracts allow renters 110 to define the periodicity with which hosts 105 must prove they still have the uploaded data. As such, establishing a verification schedule requires negotiation with the host 105. Hosts 105 submit proof of storage to the Blockchain 130 periodically, according to the agreed schedule.

Inputs. The host 105 submits a signed statement to the Blockchain 130 according to the schedule, containing:
  PUT (or EXT) contract ID
  Proof-of-Storage response Protocol. The host 105 must submit exactly one signed statement to the Blockchain 130 per interval based on the verification schedule. The Proof-of-Storage challenge is based on the block closest to the schedule. The host 105 has up to the verification validity to submit the signed statement. The absence of a signed verification from the host 105 on the Blockchain 130 after the validity represents a PUT/EXT contract violation, and the renter 110 may be awarded collateral for the host's 105 failure to perform. If the host 105 does provide a valid signed verification, then a proportional share of the collateral based on the time elapsed from the PUT/EXT contract is returned to the host 105.

Security analysis. Respecting the verification schedule is in the best interest of the host 105, since it will be able to retrieve its collateral.

Scalability analysis. Verification statements that are out of the verification schedule are ignored by the contract engine 120 of Blockchain 130 minters, and do not effect on-chain scalability.

A renter 110 and host 105 may collude to try to flood the Blockchain 130 with verification statements, but the parties will be prevented by the contract engines 120 of Blockchain 130 minters enforcing minimum intervals between verifications in the PUT and EXT contracts.

Download a File

The download protocol (GET) defines how data can be retrieved from the DSS system 100. Embodiments of the GET protocol limits incentives for hosts 105 or renters 110 to be non-compliant, and also provides remedies for contract parties who can prove non-compliant behavior. In particular, the GET protocol prevents hosts 105 from mishandling renter 110 data because the hosts 105 are required to prove, via the Blockchain 130, that the hosts 105 have returned correct data to the renter 110. Furthermore, the GET protocol prevents the renter 110 from abandoning the protocol after receiving data from the host 105, as the renter 110 must confirm receipt before receiving the key to decrypt its data. Advantageously, the requirements of embodiments of the GET protocol compel hosts 105 and renters 110 to fulfill their obligations under the storage contract.

The GET protocol is split in three phases: finding the hosts 105 with the data, negotiating download contracts with the hosts 105, and submitting proof that the data was downloaded from the hosts 105.

Inputs. For the second phase, the renter 110 generates a download contract proposal containing:

PUT contract ID (CID)
Byte range (used for partial downloads)
Total value for download bandwidth (in DBC)
Download chunk size
Proof-of-storage challenge
Offer validity (in hours)
Dispute validity (in hours)

The host 105 generates a signed download contract containing:

The download contract proposal from the renter
Proof-of-storage response
Key commitment, e.g., a salted hash of a symmetric key SK For the third phase, the host 105 sends signed statements to the renter 110 containing:

Download contract ID, i.e., a hash of the signed GET contract
Chunk number
Chunk data, encrypted using authenticated encryption [13] with key SK
A Merkle path on a tree whose root is the Merkle leaf which contains this chunk Once the renter 110 downloads all chunks of data, the renter 110 sends a signed statement to the host 105 containing:

Download contract ID
A checksum of all the downloaded encrypted data

The host 105 then submits a signed statement to the Blockchain 130 containing:

Signed checksum from the renter
Symmetric key SK in plaintext

The renter 110 can dispute the validity of the download contract with a signed statement containing:

Download contract ID
An authenticated encrypted chunk from the host 105

Protocol. The first phase is performed by the renter 110 by scanning the Blockchain 130 for the storage contract corresponding to the desired data. During this scan, the renter 110 filters the hosts 105 according to the renter's 110 requirements (e.g., bandwidth costs), and obtains a list of potential hosts 105.

If a storage contract (PUT contract) has an associated access contract (PERM contract) (as will be discussed in more detail below), then hosts 105 must enforce download restrictions according to the permissions designed in the access contract. By default, the only member 105, 110, 113 allowed to download data is the party to the storage contract.

The second phase is a direct negotiation with potential hosts 105. The renter 110 sends a download contract proposal to the host 105, which the host 105 is free to accept or reject. If the download contract proposal is rejected, the host 105 may indicate the reason (e.g., the offer validity is too small or too large). If the download contract proposal is accepted, the host 105 must generate and add to the download contract proof-of-storage and a symmetric download key SK, sign the download contract, and return the download contract to the renter 110. The renter 110 then adds its signature to the signed download contract, and submits the download contract to the Blockchain 130. The contract engine 120 of the next Blockchain 130 minter validates the download contract. For example, the minter may check that the renter 110 has sufficient funds in its wallet to fulfill the download contract. In further embodiments, the Blockchain 130 minter may check that the remaining budget allocated in an access contract (PERM contract) permits the data download. Once the download contract is included in the Blockchain 130, the download contract becomes valid.

It is important to notice that a download contract must be concurrent with its corresponding upload contract. Thus, the contract engine 120 of a Blockchain 130 minter will not accept a download contract that extends beyond the end date of the upload contract.

In the third phase, the renter 110 and host 105 must complete the data download before the download contract expires. The download contract expiration date is defined by the timestamp of the block for the contract or the contract's start date (whichever is later), plus the offer validity. Once a download contract expires, all data related to the contract (including partial downloaded data) may be discarded. In other words, the renter 110 and host 105 must agree on the amount of time required to download the amount of data specified in the download contract, under pain of wasting bandwidth without compensation.

As soon as the download contract becomes valid, the host 105 encrypts the stored data in chunks with the symmetric key SK, using an authenticated encryption algorithm. In some embodiments, chunk size can be smaller than the Merkle tree leaf size, but not larger. In further embodiments, chunk size may be a power-of-two division of the leaf size. If the chunk size is smaller than a leaf on the original Merkle tree, then each encrypted chunk may include a new Merkle tree path in which the original leaf is the root, and the current chunk is the leaf. The host 105 sends the encrypted chunks of data to the renter 110. Once the data transmission is completed, the renter 110 computes a checksum of all the encrypted data, signs the checksum, and sends the signed checksum back to the host 105. The host 105 verifies that the checksum matches the checksum the host 105 had computed for the data, adds the symmetric key SK, signs the checksum and key SK, and submits a statement with the information to the Blockchain 130. Once that signed checksum with key is included in the Blockchain 130, the download contract is considered settled. Then, the renter 110 retrieves the symmetric key SK and uses it to decrypt the data locally.

Figure 10:
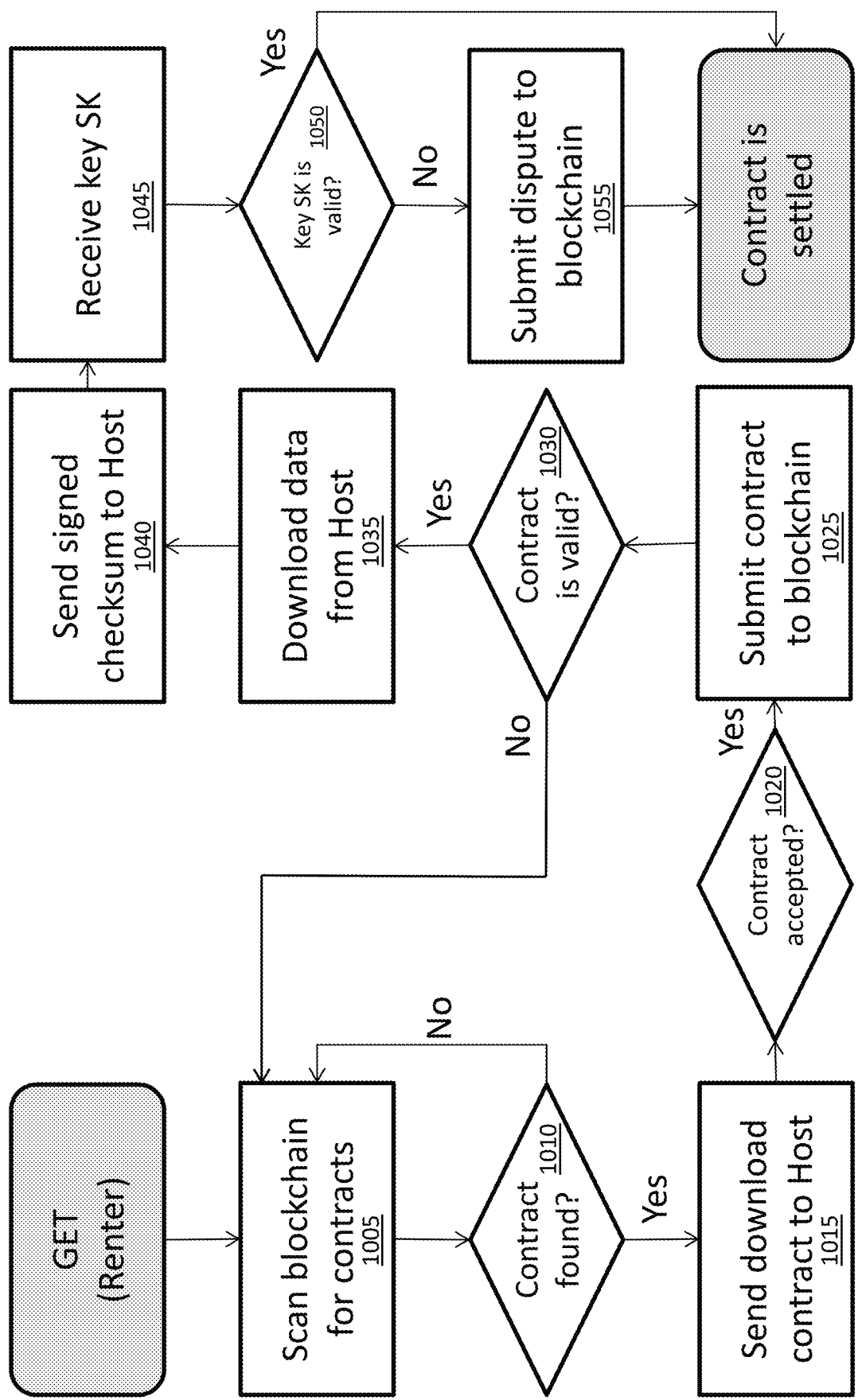
FIG. 10 is a flow diagram of computer processes associated with a GET protocol, as followed by a renter, to download data from a host, according to an embodiment of the present invention.

FIG. 10 is a flow diagram of computer processes associated with a GET protocol, as followed by a renter, to download data from a host, according to an embodiment of the present invention. The renter 110 scans the Blockchain 130 for the block corresponding to one of its storage contracts (PUT or EXT contract) (process 1005). If the renter 110 fails to find the desired block, the renter 110 continues scanning the Blockchain 130 (process 1005). After finding the block for its storage contract (process 1010), the renter 110 sends a download contract proposal to the host 105 to retrieve its stored data (process 1015). The download contract proposal may include the identifier of the storage contract, as well as any of the terms described above as an input to the GET protocol. The renter 110 waits to receive an acceptance of the download contract (process 1020). In some embodiments, the acceptance is a signed download contract that returns the proposal provided by the renter 110 and also includes proof that the host 105 has maintained the data.

The renter 110 signs the download contract from the host 105 and submits the download contract to the Blockchain 130 (process 1025). The renter 110 receives confirmation from a Blockchain 130 minter that the download contract has been added to the Blockchain 130 (process 1030). The renter 110 then receives the requested data from the host 105 (process 1035). After the renter 110 finishes receiving data, the renter 110 computes a checksum of the data, and signs and sends the checksum to the host 105 (process 1040).

Because the received data may be encrypted, the renter 110 accesses a key SK posted to the Blockchain 130 by the host 105 (process 1045). The renter 110 determines if the key SK is valid (process 1050). For example, the renter 110 may attempt to decrypt a chunk of the data downloaded from the host 105. If this attempt successfully yields a portion of the renter's 110 desired data, the key SK is valid, and the renter 110 continues to decrypt the data. However, if the decryption attempt fails to yield a valid result, the renter 110 can prepare and submit a dispute to the Blockchain 130 (process 1055). In some embodiments, the renter 110 can be awarded a refund for the host's 105 failure to perform the terms of the download contract.

Figure 11:
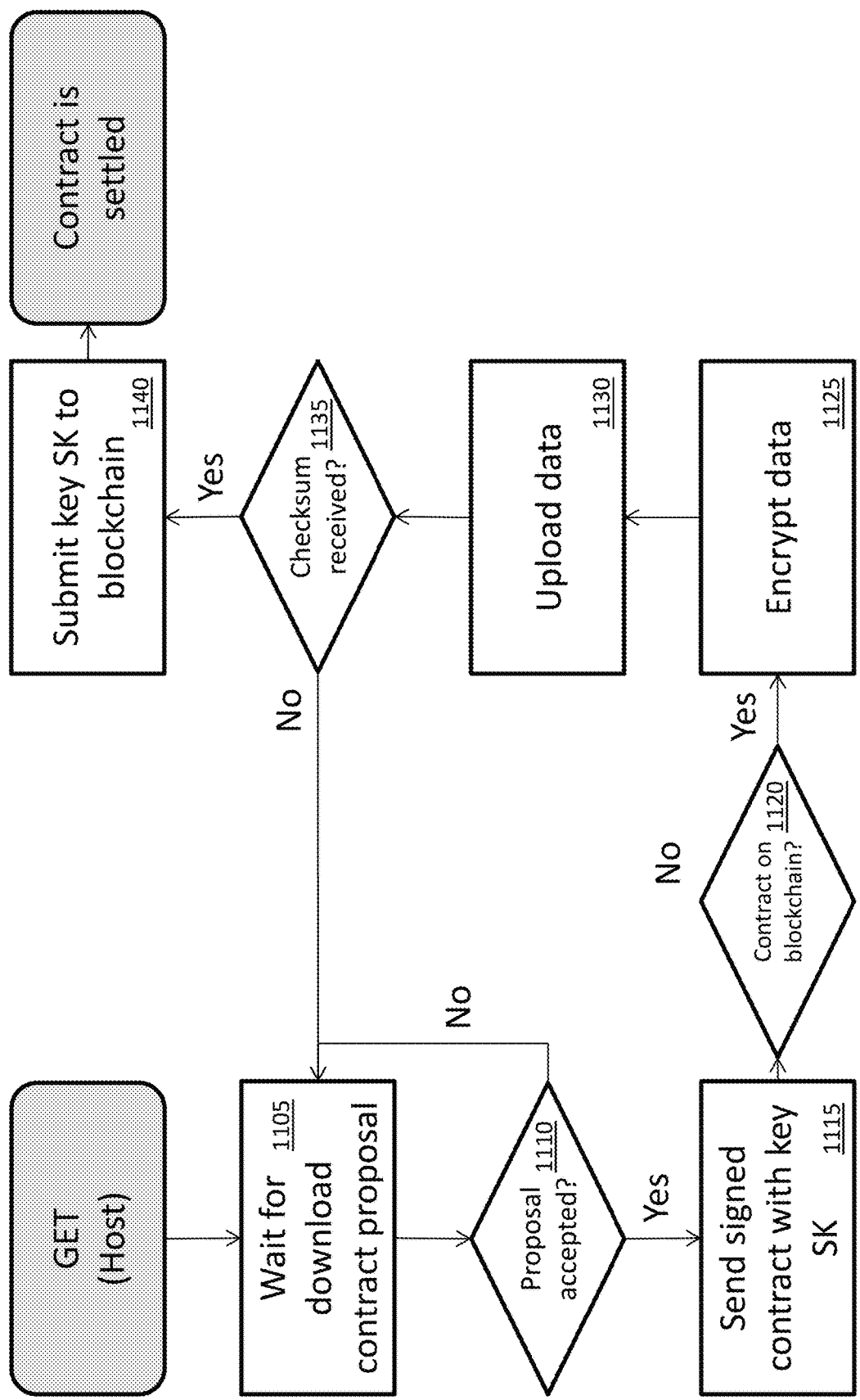
FIG. 11 is a flow diagram of computer processes associated with the GET protocol, as followed by the host, to download data from the host, according to an embodiment of the present invention.

FIG. 11 is a flow diagram of computer processes associated with the GET protocol, as followed by a host, to download data from the host, according to an embodiment of the present invention. The host 105 waits for download contract proposals from existing renters 110 (process 1105). When the host 105 receives a download contract proposal, the host 105 accepts (process 1110). The host 105 prepares and sends a signed download contract to the renter 110 (process 1115). The download contract may include information about the key SK that will be used to encrypt the data that will be transmitted. In some embodiments, this information may be a hash of the key SK, rather than the key SK in plaintext. The host 105 waits for confirmation from a Blockchain 130 minter that the download contract has been added to the Blockchain 130 (process 1120).

The host 105 retrieves data for the renter 110 from storage. The host 105 divides the data into chunks, and encrypts each chunk with the key SK (process 1125). The host 105 transmits the encrypted chunks of data, thereby uploading the data to the renter 110 (process 1130), and computes a checksum of the transmitted data. After the transmission is complete, the host 105 receives a signed checksum from the renter 110 (process 1135). A match between the checksum received by the host 105 and its own computed checksum indicates that the renter 110 has received all of the data sent by the host 105. The host 105 adds the key SK to the signed checksum from the renter 110, signs the statement, and sends the statements to the Blockchain 130 (process 1140).

Figure 12:
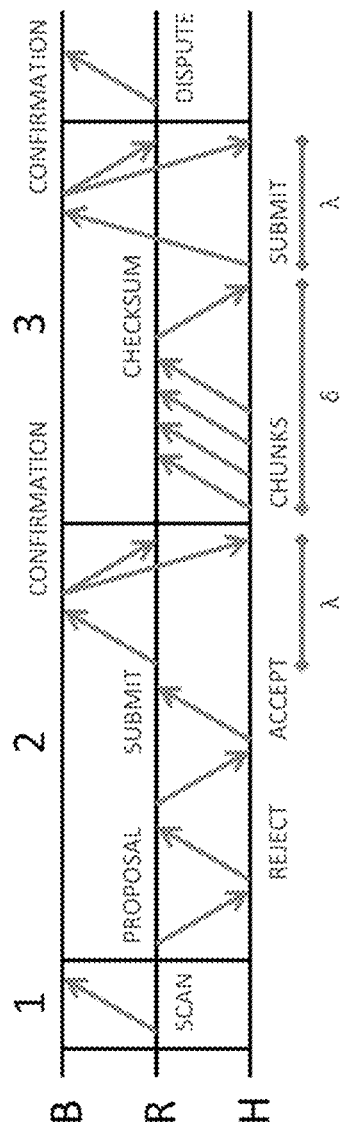
FIG. 12 depicts a set of timelines representing communications, performed during the GET protocol, by the renter, host, and Blockchain, according to an embodiment of the present invention.

FIG. 12 depicts a set of timelines representing communications, performed during a GET protocol, by the renter (represented by "R"), the host (represented by "H"), and the Blockchain (represented by "B"), according to an embodiment of the present invention. The timeline depicts the three phases of the GET protocol, as described above. During the first phase, the renter 110 scans the Blockchain 130 for prospective hosts 105. During the second phase, the renter 110 and a selected host 105 negotiate a download contract. The renter 110 may send download contract proposals with different terms until the host 105 accepts a proposal, at which point the renter 110 submits a download contract signed by both parties to the Blockchain 130. The Blockchain 130 minter verifies the download contract, according to the processes described herein, adds the download contract to the Blockchain 130, and sends confirmation of this addition to the renter 110 and host 105.

In phase three, the host 105 transmits chunks of data to the renter 110. The renter 110 determines a checksum for the data, signs the checksum, and sends the signed checksum to the host 105. The host 105 compares the checksum against its own computed checksum, and if the values match, the host 105 adds its signature to the checksum and submits the checksum to the Blockchain 130. The minter for the Blockchain 130 sends confirmation to the renter 110 and host 105 that the signed checksum has been added to the Blockchain 130.

Security analysis. The download protocol follows the same pattern as the upload protocol, but has a different set of motivations. In the upload protocol the host 105 has a strong incentive to be honest, both because of future payment and the penalty of collateral loss. In the download protocol there is no future incentive for a renter 110, since once the data is downloaded, a renter 110 can just leave the protocol unfinished to avoid payment. Like in the PUT protocol, there are a limited number of ways in which either renter 110 or host 105 can misbehave.

First, the renter 110 may not submit the accepted download contract to the Blockchain 130. Since contracts are not settled until the download is completed, and hosts 105 are not required to pre-allocate resources, there is no financial loss for the host 105. Furthermore, the host 105 may apply individual penalties against that renter 110, such as increasing prices in future contracts, temporarily blocking a renter 110, or even blacklisting the renter 110 altogether. As discussed above, off-chain reputation systems may be used to report bad renter behavior.

Second, the host 105 may refuse to send the data, or the Merkle proofs at the end of the download. Once again, since contracts are not settled until the download is completed, and renters 110 are not required to pre-allocate resources, there is no long-term financial loss for the renter 110 as the contract will eventually expire. The renter 110 may apply individual penalties against that host 105, such as increasing the amount of collateral needed in future contracts, temporarily blocking a host 105, or even blacklisting a host 105 altogether. As discussed above, off-chain reputation systems may be used to report bad host behavior.

Third, the renter 110 may not send a signed checksum, or not ask for the Merkle proofs at the end of the download. In this case the host's 105 bandwidth was wasted, but so was the renter's 110. In other words, there is no financial incentive for the renter 110 to stop the protocol midway, especially since the data is encrypted. Also in this case the host 105 may apply individual penalties against that renter 110.

Fourth, the renter 110 may send a signed bad checksum. Here the host 105 can prove that the renter 110 is misbehaving, by including a proof based on the Merkle root for the encrypted data that was included in the sent data. With this proof the host 105 can be awarded the value of the contract, since the host 105 can prove it completed its part of the contract. Additional individual penalties may also apply.

Fifth, the host 105 may not submit the signed checksum to the Blockchain 130. In this case the renter's 110 bandwidth was wasted, but so was the host's 105—once again there is no incentive to misbehave. Since the renter 110 may discard all data related to expired contracts, there are no long-term losses. Here again the renter 110 may apply individual penalties against the host 105.

Sixth, the host 105 may provide a wrong key SK. In this case the renter 110 may dispute the contract by submitting one of the authenticated encrypted chunks. Since the key SK is publicly available, any third party can check that the decryption of the chunk does not yield a valid result. The renter 110 is allowed to submit a dispute transaction from the moment the key SK is revealed up to the dispute validity of the download contract. If a valid dispute is submitted to the Blockchain 130, the contract engine 120 for a Blockchain minter will revert the payment for the download contract.

Finally, the host 105 may have sent completely wrong data, despite having provided valid proof-of-storage. Since the host 105 proved that they do possess the data, there was no incentive to not provide the real data, except for malicious purposes. In this case the renter 110 may dispute the contract by submitting the signed Merkle path of a chunk for which the renter 110 received proof-of-storage, and the corresponding path from the proof of storage. It is considered impossible for a renter 110 to forge a dispute, since disputes require a signed statement from the host 105 (which was provided during the download). The contract engine 120 of a Blockchain 130 minter will verify that the subpath (e.g., the one from the chunk to the original leaf) does not match the original leaf, in which case the Blockchain minter will revert payment for the download contract.

Scalability analysis. Once the Blockchain 130 has been replicated, the first phase may be analogized to an offline indexing operation. Since the first phase can be resolved locally, the first phase does not affect the scalability of the Blockchain 130. The second phase is performed in a peer-to-peer and off-chain fashion, up to the point that a download contract proposal is accepted. At that point there is one transaction that requires on-chain interaction. The third phase is performed also in a peer-to-peer off-chain fashion, since data is sent directly from host 105 to renter 110. When the data download is completed, there is one additional on-chain interaction. In case of dispute, there will be one final on-chain interaction.

The GET protocol may be analogized to a Blockchain-backed two-phase commit, and as such, scales well as long as there is no or low contention. Since in this case there is no collateral involved, there is no major source of contention.

The contract dispute may be a source of network congestion if chunks are allowed to be arbitrarily large. Both the host 105 and the contract engine 120 of a Blockchain 130 minter can enforce reasonable limits to the size of data chunk at the download negotiation and proposal, respectively.

Optimizations. In the case of a storage network the most important metrics are bandwidth and latency. If $\lambda$ is the delay between submitting a download contract to the Blockchain 130 and receiving confirmation that the download contract has been added to the Blockchain 130, and $\delta$ is the time needed to download the file, then the latency $\Delta_{GET}$ of a non-optimized GET is:

$$\Delta_{GET} = 2 \times \lambda + \delta$$

That $2\lambda$ latency is necessary if the host does not trust the renter.

If the hosts 105 want to operate under the assumption that a renter 110 seeking a data download is not Byzantine (which is statistically true), the hosts 105 can start sending data to the renter 110 before receiving confirmation that the signed download contract has been added to the Blockchain 130. Assuming that the data download takes longer than the blockchain delay, i.e., $\delta > \lambda$ then the effective downloader GET latency is $\Delta_{GETe} = \delta$, since by the time the download is finished the signed GET contract will have been included in a block, and the host 105 can provide the key SK for decryption directly to the renter 110 once the host 105 receives the signed checksum. As a result, under an optimized GET protocol, a data download should take no longer than a traditional client-server download.

Figure 13:
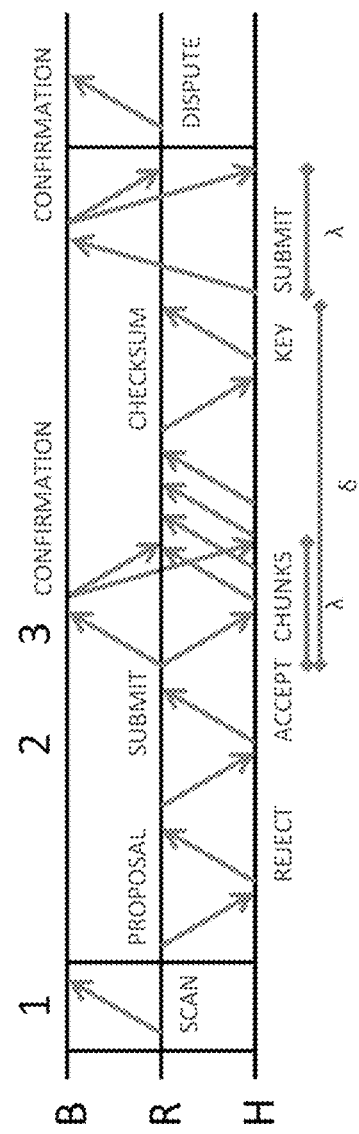
FIG. 13 depicts a set of timelines representing communications, performed during an optimized version of the GET protocol, by the renter, the host, and the Blockchain, according to an embodiment of the present invention.

FIG. 13 depicts a set of timelines representing communications, performed during an optimized version of the GET protocol, by the renter 110, the host 105, and the Blockchain 130, according to an embodiment of the present invention. The timeline replicates FIG. 12, except that the renter 110 simultaneously sends the download contract to the Blockchain 130 and a notification to the host 105, and the host 105 sends data to the renter 110 thereafter, without waiting for confirmation that the download contract has been added to the Blockchain 130.

It is important to notice that these optimizations do not compromise the BFT properties of the GET protocol. For the host 105, the worst that can happen when using the optimized GET are the third and fourth cases presented in the security analysis, where the renter 110 does not return the signed checksum after the download, causing the host 105 to waste its bandwidth and CPU time used for encrypting the data. For the renter 110, the worst that can happen when using the optimized GET is the sixth case, where the host 105 provides a wrong or fake SK to the Blockchain 130. Once again, since the renter 110 can dispute the contract the only thing lost is the download bandwidth of the renter 110.

Download Policy Definition

The "download policy" protocol (PERM) defines which members of 105, 110, 113 of the DDS system 100 are allowed to access data, and how the access will be paid. By default, accesses are allowed only by the original uploader, and payment is negotiated during the download. Using PERM, renters 110 can provide a white- or blacklist of members 105, 110, 113 that are allowed to (or disallowed from) access data. Alternative, renters 110 may just allow anyone to access their data.

Advantageously, the PERM protocol incentivizes parties to participate in the DSS system 100, as the protocol externalizes the cost of downloading data to the party granting access to the data. In conventional distributed storage systems, a host bears the costs of providing data that it has stored, and consequently, hosts may accept data for storage, but not make it available for download. In contrast, under the PERM protocol, a renter allocates funds for future downloads of data, and thereby removes obstacles to delivery of such data. In fact, the PERM protocol encourages hosts to distribute data, and the protocol provides them with additional revenue.

More specifically, the PERM protocol allows renters 110 to negotiate predefined download bandwidth prices and quotas with hosts 105, and allocate funds towards that end. In some embodiments, the PERM protocol allows renters 110 to leverage the DSS system 100 as a content distribution network.

Inputs. The renter 110 and host 105 must sign an access contract containing:
PUT contract ID (CID)
Access permissions
Renter-provided metadata
Access bandwidth price (in DBC/TB)
Total access budget (in DBC)

Protocol. The renter 110 and host 105 negotiate an access contract, which is signed by both if accepted and then submitted to the Blockchain 130.

Once included in the Blockchain 130, the host 105 may accept GET contracts from any member 105, 110, 113 listed in the access permissions of the PERM contract, and use the access budget to pay for them.

A PERM contract is subjected to the existence of a valid PUT contract. Consequently, a PUT contract violation immediately voids all related PERM contracts.

Figure 14:
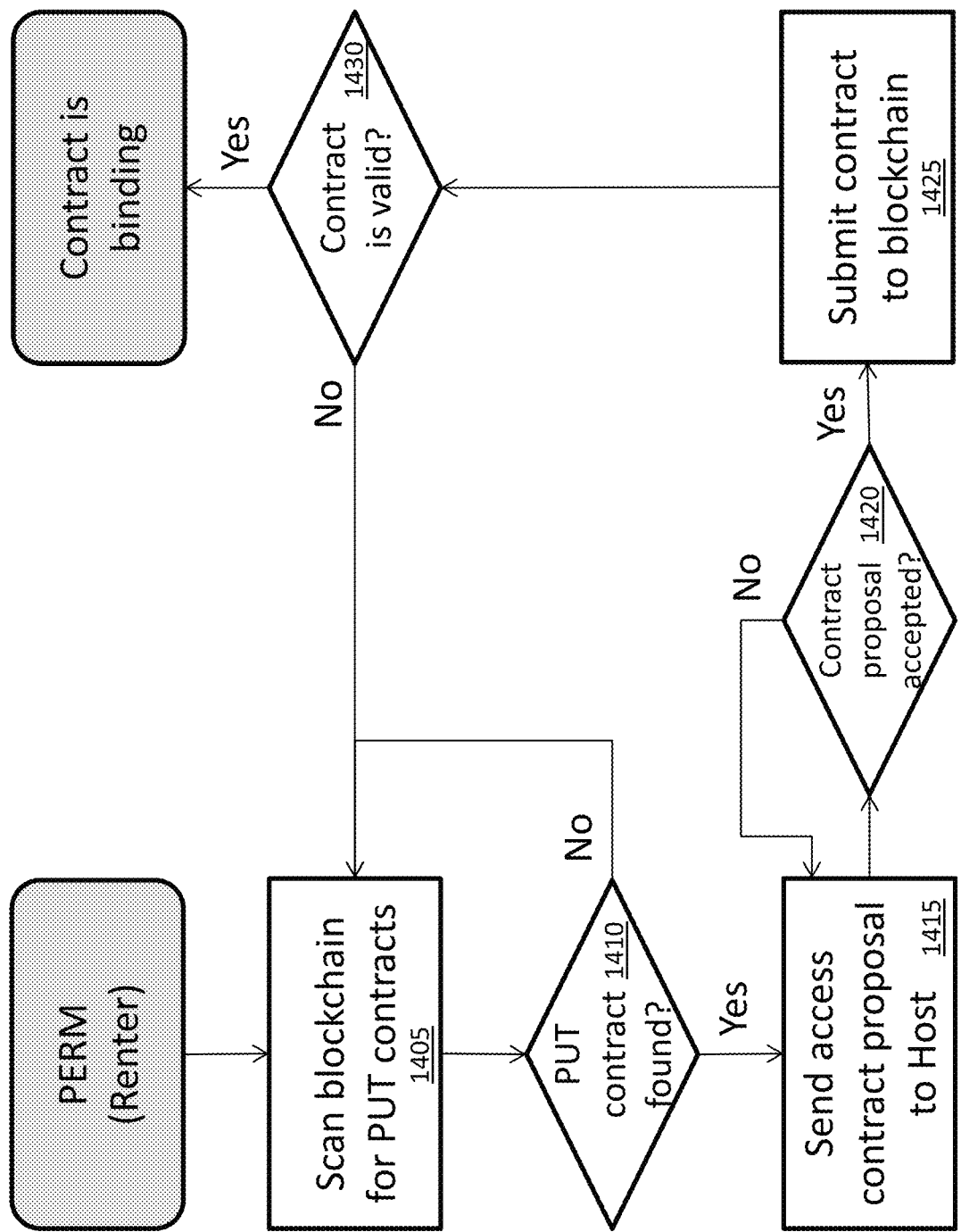
FIG. 14 is an exemplary flow diagram of computer processes associated with a PERM protocol, as followed by a renter, to identify members permitted to access data that the renter has stored on a host, according to an embodiment of the present invention.

FIG. 14 is a flow diagram of computer processes associated with a PERM protocol, as followed by a renter 110, to identify members 105, 110, 113 permitted to access data that the renter 110 has stored on a host 105. The renter 110 scans the Blockchain 130 for the block corresponding to its storage contract (e.g., a PUT or EXT contract) (process 1405). If the renter 110 fails to find the desired block, the renter 110 continues scanning the Blockchain 130 (process 1405). After finding the block for its storage contract (process 1410), the renter 110 prepares and sends to host 105 an access contract proposal identifying members 105, 110, 113 to whom the renter 110 has granted permission to access its data. The access contract proposal includes an identifier of the original storage contract between the renter 110 and the host 105, the members 105, 110, 113 being granted access permissions to the renter's data 110, and the scope of each member's 105, 110, 113 respective permissions. The access contract proposal may include payments for accesses performed by the members 105, 110, 113, as well as any of the terms described above as inputs to the PERM protocol. The renter 110 sends the access contract proposal to the host 105 (process 1415).

The renter 110 waits for a response from the host 105 (process 1420). If the renter 110 receives a rejection, the renter 110 may revise the terms of the access contract proposal (e.g., increase payment for the accesses), and resend the updated access contract proposal (process 1415). If the renter 110 receives a signed access contract back from the host 105 (process 1420), the renter 110 adds its signature and sends the access contract to the Blockchain 130 (process 1425). The renter 110 waits for confirmation from a Blockchain 130 minter that the access contract has been added to the Blockchain 130 (process 1430), by virtue of which the access contract becomes binding.

Figure 15:
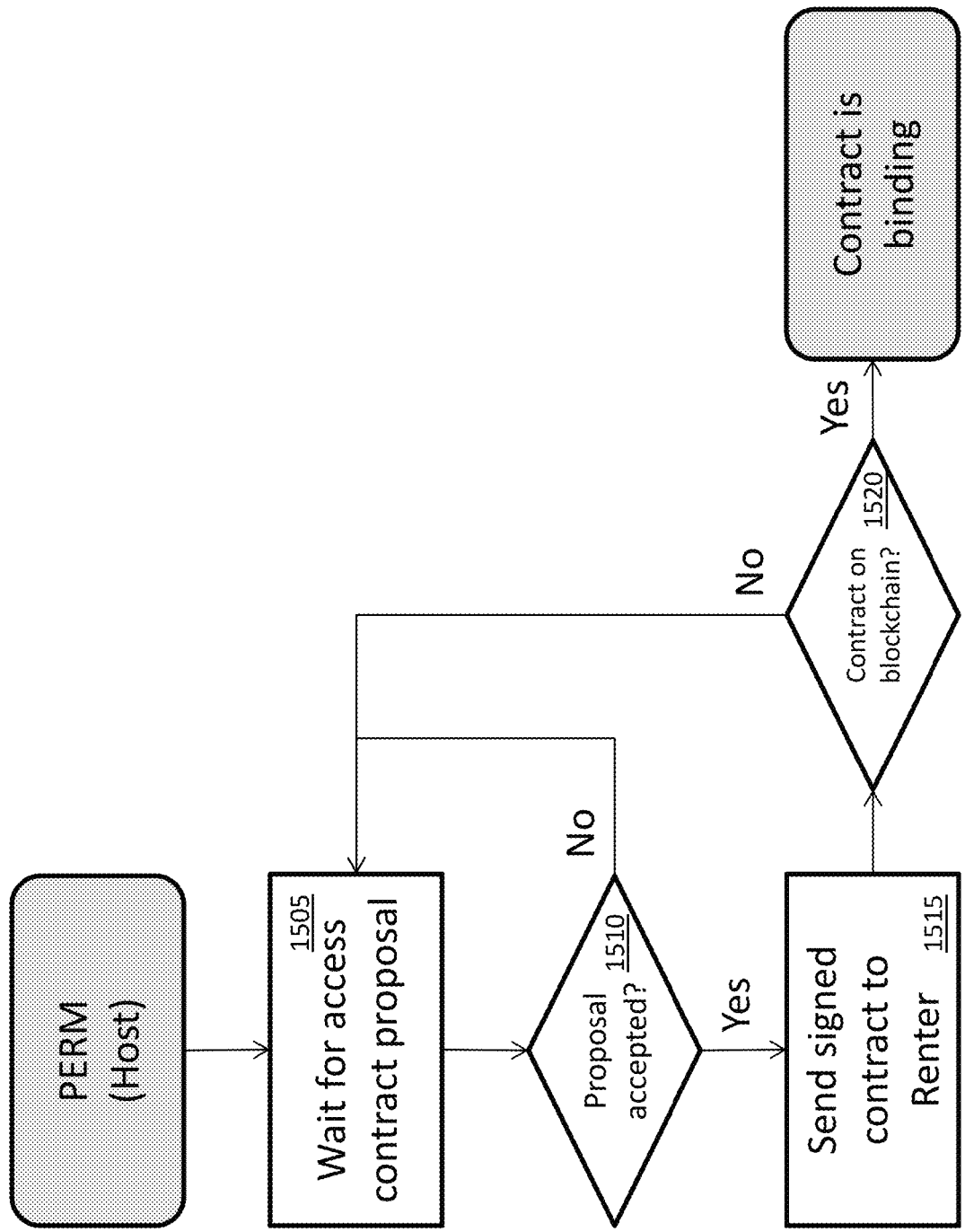
FIG. 15 is a flow diagram of computer processes associated with the PERM protocol, as followed by a host, to identify members permitted to access data that the renter has stored on the host, according to an embodiment of the present invention.

FIG. 15 is a flow diagram of computer processes associated with a PERM protocol, as followed by a host 105, to identify members 105, 110, 113 permitted to access data that the renter 110 has stored on the host 105. The host 105 waits for access contract proposals from existing renters 110 (process 1505). When the host 105 receives an access contract proposal, the host 105 determines whether to accept or reject (process 1050). If the host 105 rejects the access contact proposal, the host 105 returns to waiting for subsequent access contract proposals (process 1505). However, if the host 105 accepts, the host 105 signs and returns the access contract to the renter 110 (process 1515). The host 105 waits until the host 105 receives confirmation from a Blockchain 130 minter that the access contract has been added to the Blockchain 130 (process 1520).

Security analysis. The renter 110 can prevent abuse of the download budget by limiting the number of members 105, 110, 113 that are allowed to download data.

Store a File

The "store file" protocol (STOR) implements a Byzantine fault-tolerant (BFT) upload protocol. It extends the PUT protocol to provide confidentiality and BFT recovery. The STOR protocol is based on [14]. In particular, embodiments of the STOR protocol distribute data storage across multiple hosts 105 such that, if one or more hosts 105 fails to comply with its PUT or GET contracts with a renter 110, the renter 110 may still recover the distributed stored data in its entirety. In this manner, embodiments of the STOR protocol offer additional protections for a renter's 110 data, beyond those offered in the prior art.

The STOR protocol uses an m-of-n sharding algorithm to divide data in a way that any m shards out of a total of n shards that were originally uploaded can be used to reconstruct the original data. Each of these shards is uploaded using the PUT protocol to a different host 105.

Inputs. The renter 110 must sign a statement containing:
List of associated PUT contracts IDs
Renter-provided metadata Protocol. The renter 110 must prepare the data, and the preparation depends on the type of protection that the renter 110 wants to achieve.

First, if the renter 110 requires confidentiality (e.g., the data may be a personal), the renter 110 may perform an authenticated encryption of the data using a symmetric key SK. In some embodiments, the keys in encrypted format are included as part of the STOR statement metadata, which allows full recovery of data from information stored on the Blockchain 130, alone.

Second, the renter 110 may split the data in shards using an erasure code, such as Reed-Solomon. The number of data shards and parity shards depend on the quality of service required by the renter 110. The renter 110 negotiates PUT contracts with as many different hosts 105 as there are shards, and uploads these shards to the hosts 105.

Finally, the renter 110 submits a signed STOR statement to the Blockchain 130 that a sentinel 113 can use to execute data repairs, as will be explained in more detail below, and/or used to download and reconstruct the data stored on multiple hosts 105.

Figure 16:
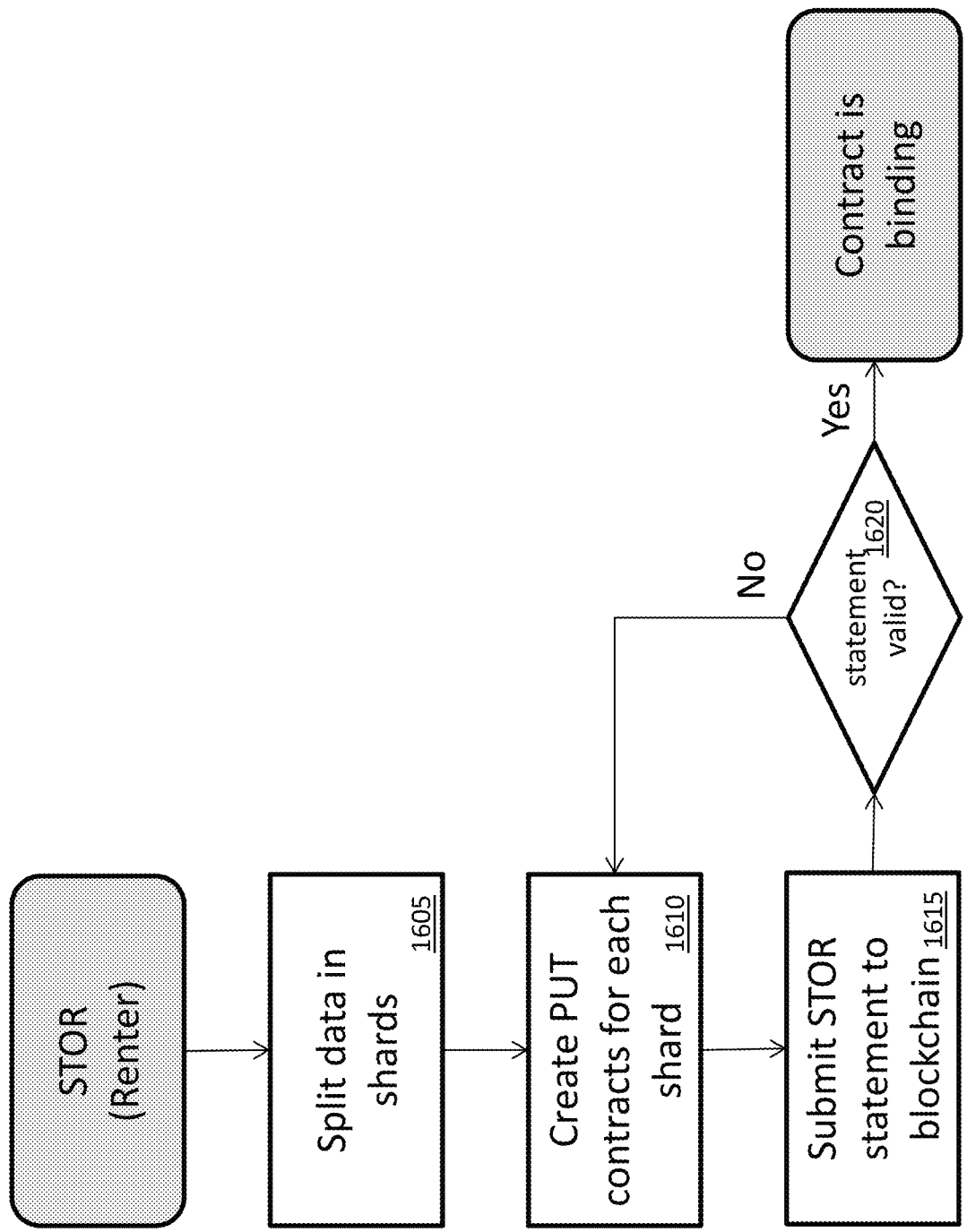
FIG. 16 is a flow diagram of computer processes associated with a STOR protocol, as followed by a renter, to store data with a heightened level of security, according to an embodiment of the present invention.

FIG. 16 is a flow diagram of computer processes associated with a STOR protocol, as followed by a renter 110, to store data with a heightened level of security. The renter 110 divides data to be stored into shards (process 1605). In some embodiments, the renter 110 uses an erasure code, such as Reed-Solomon, to divide the data. The renter 110 scans the Blockchain 130 for hosts 105, and selects multiple hosts 105 to collectively store the shards. The renter 110 prepares multiple storage contracts, each storage contract designating a particular shard of data to be stored. The renter 110 signs and sends each storage contract to a different host 105 (process 1610), and waits for each contacted host 105 to return a signed storage contract. After the renter 110 receives signed contracts from all of the hosts 105, thus ensuring that all of data can be stored on the DSS system 100, the renter 110 prepares a statement that identifies all of the storage contracts made with the hosts 105 (also referred to herein as a "STOR statement"). The renter 110 signs the STOR statement and submits the statement to the Blockchain 130 (process 1615). The renter 110 receives confirmation from a Blockchain 130 minter that the STOR statement has been added to the Blockchain 130 (process 1620).

Security analysis. The STOR statement builds upon the guarantees of the PUT protocol, and as such offers the same level of protection against BFT.

Scalability analysis. The STOR statement promotes blockchain-based account recovery, particularly third-party repair services.

Repair Policy Definition

In various embodiments, a repair service hosted by the DSS system 100 can be used to ensure that data stored in on the hosts 105 preserve their availability levels. This repair service is Byzantine fault tolerant, and has two parts: the "repair policy" protocol (SEN), and the "repair data" protocol (FIX). Repairing data ensures that the redundancy levels requested in the STOR protocol are preserved, even in case of a PUT or EXT contract violation. The repair policy defines which sentinel 113 is responsible for performing data repairs, under which conditions, and how much additional funding can be spent towards repairing data.

Under conventional distributed storage systems, hosts 105 bear the burden of preserving redundancy levels by, if necessary, resharding stored data. However, given the computational costs of resharding, hosts 105 have little incentive to undertake the operation. Advantageously, the SEN protocol shifts this burden from the hosts 105 to sentinels 113 chosen by the renter 110. The SEN protocol gives renters 110 the capability to commission sentinels 113 to make repairs to stored data and provide funding for the service.

Inputs. The renter 110 and the sentinel 113 sign a repair contract (SEN) containing:
STOR contract ID, i.e., a hash of the STOR contract
Repair criteria
Fee per repair (in DBC)
Repair budget (in DBC)

Protocol. The renter 110 selects a sentinel 113 that the renter 110 considers trustworthy to enact data repair services on its behalf. This selection may happen off-chain, e.g., by direct indication of a sentinel's 113 DSS ID, or by scanning the Blockchain 130 for sentinels 113 that have a history of trustworthiness.

The renter 110 and sentinel 113 negotiate the criteria and additional budget for data repairs. The repair criteria defines the conditions that must be met before data repair takes place, e.g., how many PUT violations need to happen before a repair is triggered. The repair budget defines how much the sentinel 113 can spend with additional PUT contracts that may be necessary to restore the data's initial redundancy levels. These additional funds are available to the sentinel 113 only once the collateral of the PUT (or EXT) contract has been completely spent. The repair fee is the amount of coins that will be awarded to the sentinel 113 for each successful data repair. The fee is also awarded once when the SEN is settled, such as when a data repair attempt fails due to insufficient funds.

The sentinel 113 must check that there are valid access contracts (PERM contracts) in place with all hosts 105 storing shards of data, with sufficient funds for the sentinel 113 to download the shards according to the repair criteria. The sentinel 113 may notify the renter 110 of missing PERM contracts before accepting a repair policy.

Once both renter 110 and sentinel 113 agree to the terms of the repair contract, both parties sign the repair contract, and the renter 110 submits the repair contract to the Blockchain 130.

Figure 17:
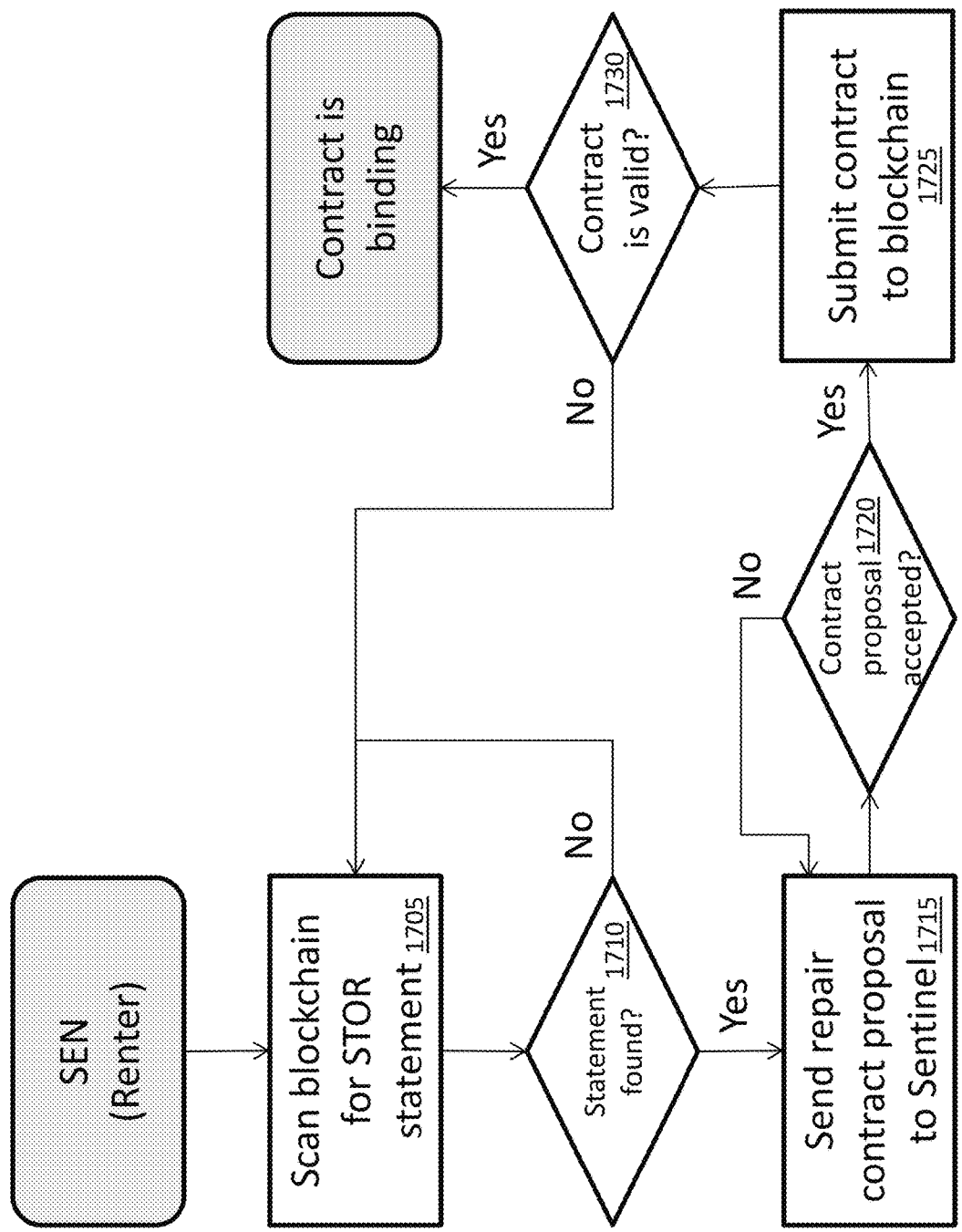
FIG. 17 is a flow diagram of computer processes associated with a SEN protocol, as followed by a renter, to allow a sentinel to manage repairs to the renter's stored data, according to an embodiment of the present invention.

FIG. 17 is a flow diagram of computer processes associated with a SEN protocol, as followed by a renter 110, to allow a sentinel 113 to manage repairs to the renter's 110 stored data. The renter 110 selects a sentinel 113 to perform data repair on its behalf. The renter 110 scans the Blockchain 130 for the block corresponding to its STOR statement (process 1705). If the renter 110 fails to find the desired block, the renter 110 continues scanning the Blockchain (process 1705). After finding the block for its STOR statement (process 1710), the renter 110 signs and sends a repair contract proposal to the selected sentinel 113 with the terms for performing data repair on behalf of the renter 110, according to the storage contracts in the STOR statement (process 1715). The repair contract proposal includes any of the terms described as inputs to the SEN protocol. The renter 110 waits for an acceptance of the repair contract proposal from the sentinel 113. The renter 110 may receive a rejection of the repair contract proposal, revise the proposal according to the reason(s) given by the sentinel 113, and send an updated proposal (process 1715). In this manner, the renter 110 may continue altering its repair contract proposal until the renter 110 receives a signed repair contract, i.e., an acceptance from the sentinel 113 (process 1720). The renter 110 signs and sends the accepted repair contract 113 to the Blockchain 130 (process 1725). The renter 110 receives confirmation from a Blockchain 130 minter that the repair contract has been added to the Blockchain 130 (process 1730). By virtue of such addition, the repair contract becomes binding.

Figure 18:
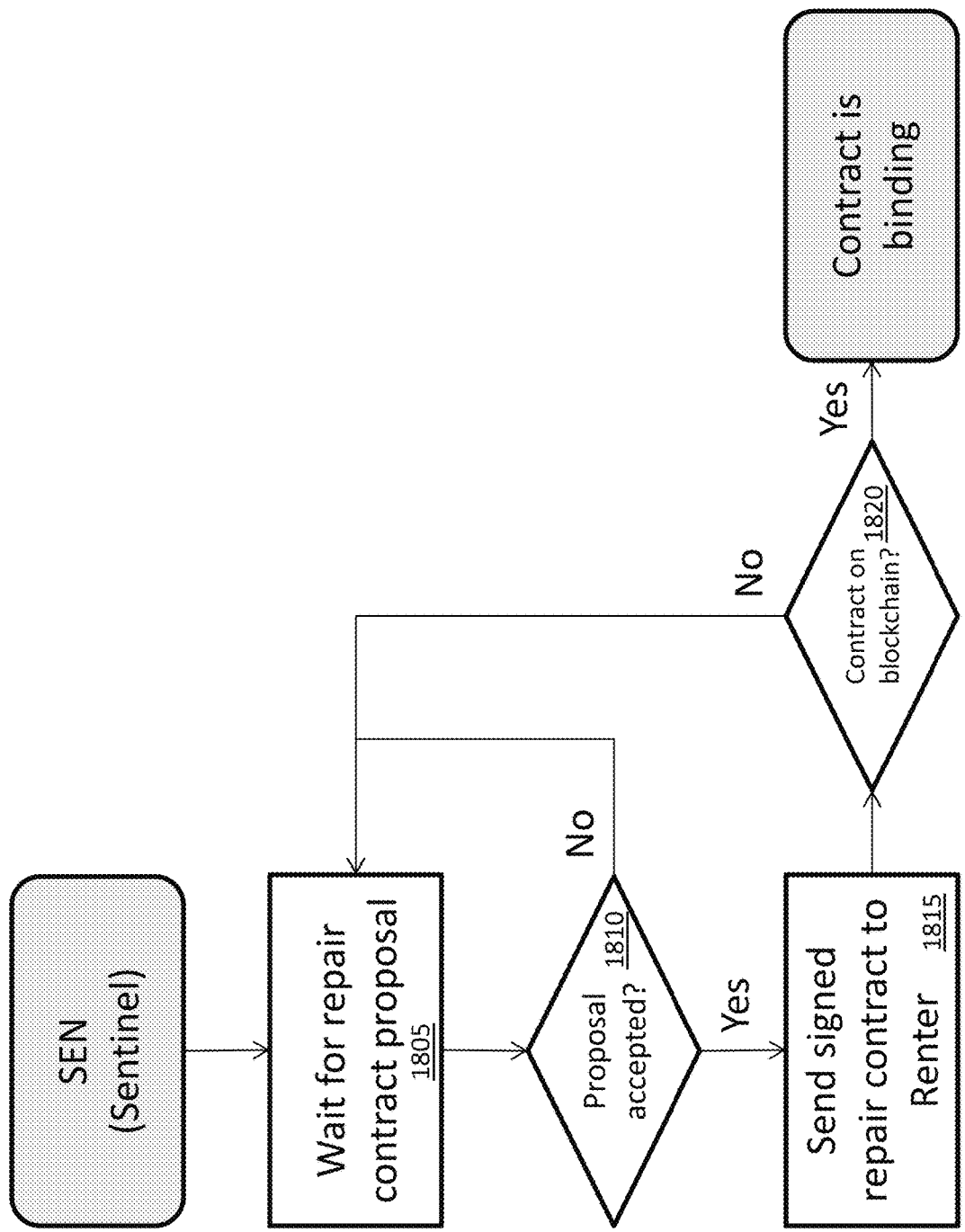
FIG. 18 is a flow diagram of computer processes associated with the SEN protocol, as followed by a sentinel, to allow a sentinel to manage repairs to a renter's stored data, according to an embodiment of the present invention.

FIG. 18 is a flow diagram of computer processes associated with a SEN protocol, as followed by a sentinel 113, to allow a sentinel 113 to manage repairs to a renter's 110 stored data, according to an embodiment of the present invention.

The sentinel 113 waits for repair contract proposals from renters 110 (process 1805). When the sentinel 113 receives a repair contract proposal, the sentinel 113 determines whether to accept or reject (process 1810). In some embodiments, the sentinel 113 ensures that storage contracts included in the repair contract proposal are valid. For example, the sentinel 113 may scan the Blockchain 130 for blocks corresponding to each storage contract in the STOR statement. The sentinel 113 may also scan the Blockchain 130 for blocks corresponding to access contracts (i.e., PERM contracts), to verify that the sentinel 113 has permission to access the hosts 105 storing the data for prospective repair.

If the sentinel 113 rejects the repair contract proposal, the sentinel 113 returns to waiting for subsequent proposals (process 1805). However, if the sentinel 113 accepts, the sentinel 113 signs and returns the repair contract to the renter 110 (process 1815). The sentinel 113 waits for confirmation from a Blockchain 130 minter that the repair contract has been added to the Blockchain 130 (process 1820).

Security analysis. The choice of a sentinel 113 is exclusively based on trustworthiness because it will have the authority to:
download a sufficient number of shards to reconstruct the original data, and;
spend funds from the renter 110 to establish new PUT contracts on the renter's 110 behalf.

As such, the renter 110 must trust the sentinel 113 (a) not to leak the reconstructed data, and (b) spend the repair budget in a way that protects the interests of the renter 110 (i.e., to not collude with hosts 105 to overspend in PUT contracts).

Scalability analysis. The SEN protocol requires the presence of a previous STOR statement on the Blockchain 130, and may generate additional PUT contracts and FIX statements depending on PUT/EXT violations.

Repair Data

The "repair data" protocol (FIX) implements a Byzantine fault-tolerant (BFT) repair protocol. In some embodiments, repairing data means ensuring that the redundancy levels required in the STOR protocol are preserved, even in case of a PUT or EXT contract violation. The sentinel 113 chosen by a renter 110 monitors PUT contract violations, and starts repairs when the criteria specified in the SEN contract is met.

Inputs. The FIX protocol requires a STOR statement and an SEN contract on the Blockchain 130.

If a repair is not possible because (1) there are no longer enough shards available, or (2) there are not enough funds, then the sentinel 113 must submit a signed statement to the Blockchain 130 containing:

SEN contract ID

Reason for repair impossibility

If a repair is successful, the sentinel 113 must submit a signed statement containing:

SEN contract ID

Additional PUT contract IDs

Protocol. Once the SEN contract has been added to the Blockchain 130, the sentinel 113 must start monitoring the Blockchain 130 for PUT contract violations. If a PUT violation occurs, the sentinel 113 verifies the repair criteria. If the repair criteria is met, for example, if a large enough number of PUT contract violations have occurred, then the sentinel 113 must repair data.

In various embodiments, data repair happens in two phases. First, the sentinel 113 downloads enough shards from hosts 105 in the list of storage contracts (e.g., PUT contracts) in the STOR statement, to reconstruct the data locally. These downloads are financed by PERM contracts that were previously established by the renter 110. If PERM contracts do not provide enough funds to download a sufficient number of shards, then the sentinel 113 submits a signed statement to the Blockchain 130 indicating that the data could not be repaired. This statement is verified by the contract engine 120 by the next minter for the Blockchain 130, by checking that the provided reason is valid. If the statement is verified, the SEN contract is considered settled. The sentinel 113 receives repair fees for attempting to fulfill its obligations under the SEN contract, but the sentinel 113 is released from its obligations to monitor or repair the stored data.

Once the sentinel 113 obtains shards to reconstruct, to the best of its ability, a local copy of the data, the sentinel 113 proceeds to the second phase of the FIX protocol. The sentinel 113 recalculates missing shards and uploads each newly reproduced shard to the host 105 responsible for its storage. In some embodiments, the sentinel 113 identifies which shards are missing based on the Merkle roots from the PUT contracts in the STOR statement. Using funds from both the remaining collateral of the broken PUT contracts and the repair budget provided by the PERM contracts, the sentinel 113 negotiates new PUT and PERM contracts with hosts 105, on behalf of the renter 110. The sentinel 113 creates a FIX statement that includes the SEN contract ID and the list of new PUT and PERM contracts, and submits the FIX statement to the Blockchain 130. When the next Blockchain 130 minter confirms that the FIX statement is valid, the sentinel 113 receives repair fees.

Figure 19:
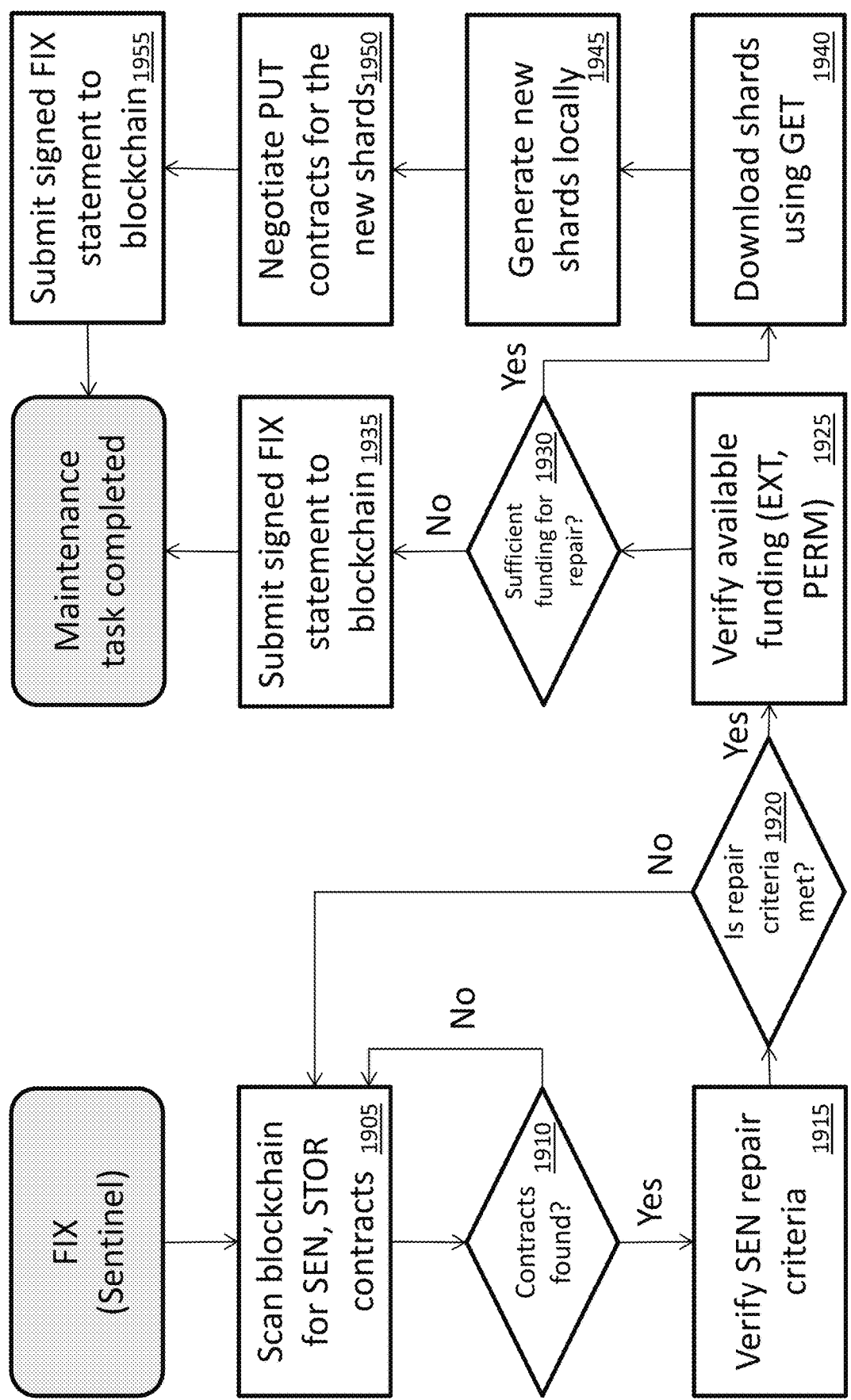
FIG. 19 is a flow diagram of computer processes associated with a FIX protocol, as followed by a sentinel, by which the sentinel manages repair of data stored on at least one host, according to an embodiment of the present invention.

FIG. 19 is a flow diagram of computer processes associated with a FIX protocol, as followed by a sentinel 113, by which the sentinel 113 manages repair of data stored on multiple hosts 105. The sentinel 113 scans the Blockchain 130 for the blocks corresponding to a repair contract (i.e., SEN contract) and the corresponding STOR statement, which identifies the hosts 105 storing the shards of data that the sentinel 113 must monitor for repair (process 1905). If the sentinel 113 fails to find the desired blocks, the sentinel 113 continues scanning the Blockchain 130 (process 1905). If the sentinel 113 retrieves its repair contract (process 1910), the sentinel 113 verifies the repair criteria contained therein (process 1915). If the repair criteria are not met, the sentinel 113 takes no action and returns to scanning the Blockchain 130 for contracts corresponding to its obligations (process 1905).

If the repair criteria are met (process 1920), the sentinel 113 verifies that the sentinel 113 has been provided with sufficient funds to perform the repairs (process 1925). For example, the sentinel 113 may scan the Blockchain 130 for access contracts (PERM contracts) that grant the sentinel 113 permission to download shards of data stored on multiple hosts 105 (process 1925). As explained above, each access contract allocates funds for third parties to access data on a particular host 105. The sentinel 113 reviews the amount of funding available to access data needing repair, and determines if the funding is sufficient (process 1930). If the funding is insufficient, the sentinel 113 prepares and signs a statement declaring that the repair cannot be performed, and submits the statement to the Blockchain 130 (process 1935).

However, if sufficient funding is available, the sentinel 113 iterates through storage contracts in the STOR statement to download, via the GET protocol, the shard(s) of data stored on each respective host 105 (process 1940). The sentinel 113 reassembles the shards, and identifies missing shards from the data. In some embodiments, such identification may be based on the Merkle roots from the storage contracts, which in turn are used to identify the hosts 105 responsible for storing the missing shards. The sentinel 113 generates new data shards to replace the missing ones (process 1945). For each newly generated shard, the sentinel 113 prepares, signs, and sends a new storage contract (e.g., PUT contract) to the host 105 responsible for storing that particular shard (process 1950). When the sentinel 113 receive signed storage contracts from all the hosts 105, the sentinel prepares the statement declaring that repairs have been fulfilled (also referred to herein as a "FIX statement"). The FIX statement can identify the repair contract between the sentinel 113 and renter 110 (e.g., SEN contract), as well as the new storage contracts the sentinel 113 created to store replacements for missing shards. The sentinel 113 signs and sends the FIX statement to the Blockchain 130 (process 1955).

Security analysis. Good behavior from the sentinel 113 is assumed by definition, since the SEN protocol represents the equivalent of "letter of attorney" granting the sentinel 113 rights to perform PUT and PERM contracts on the renter's 110 behalf. In other words, renters 110 should be extremely careful with the choice of sentinel 113 for a stored data. The emergence of a reputation-based market of trusted sentinels 113 will provide an additional source of income for members of the DSS system 100.

Scalability analysis. The FIX protocol is triggered only once the repair criteria of the SEN contract is met. The sentinel 113 can negotiate and execute several GET and PUT contracts with hosts 105, in parallel.

Retrieve Data

The "retrieve data" protocol (RETR) implements a Byzantine fault-tolerant (BFT) download protocol. It extends the GET protocol to support confidentiality and BFT recovery. The RETR protocol is based on [14].

Inputs. The renter 110 provides a list of PUT contracts, each of which corresponds to a shard of data that has been stored on a host 105. The list of PUT contracts may be stored locally on the renter 110, obtained from the Blockchain 130, or available from a previous STOR statement.

Protocol. The renter 110 selects a sufficient number of shards from the list of PUT contracts, and negotiates a GET contract with each host 105 identified in the list. The renter 110 obtains the shards, either by downloading the shards from hosts 105 by virtue of being the original uploader, or using third parties to which the renter 110 has been granted access through one or more PERM contracts. Once the renter 110 downloads the shards, the renter 110 decrypts and reconstructs the data.

Figure 20:
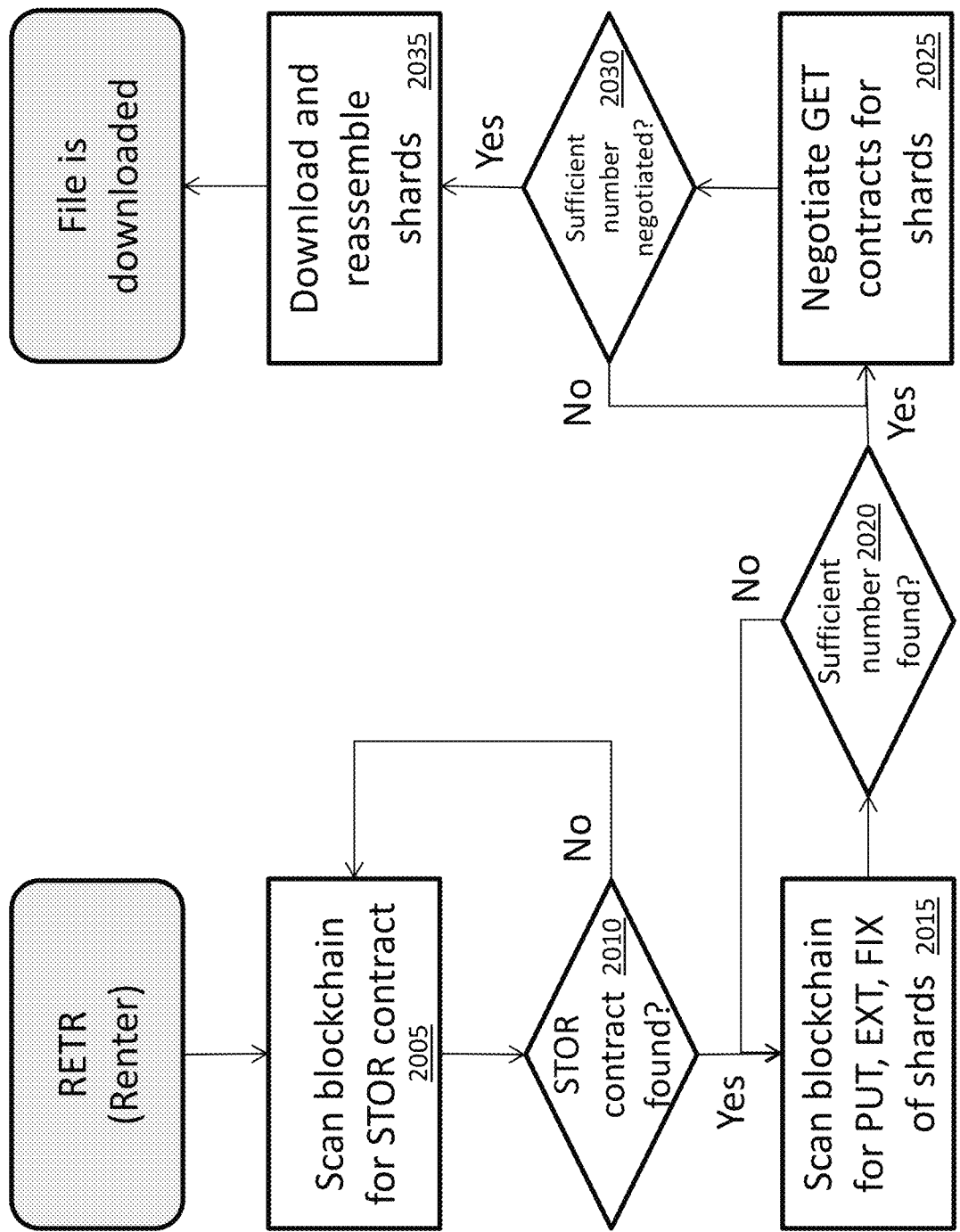
FIG. 20 is a flow diagram of computer processes associated with a RETR protocol, as followed by a renter, to retrieve shards of data that were stored on hosts using a heightened level of security, according to an embodiment of the present invention.

FIG. 20 is a flow diagram of computer processes associated with a RETR protocol, as followed by a renter 110, to retrieve shards of data that were stored on hosts 105 according to the STOR statement. The renter 110 scans the Blockchain 130 for the blocks corresponding to its STOR statement, which contains the storage contracts for the shards of data (process 2005). If the renter 110 fails to find the desired block, the renter 110 continues scanning the Blockchain 130 (process 2005). After finding the STOR statement (process 2010), the renter 110 scans the Blockchain 130 for information needed to reassemble its data (process 2015). In some embodiments, the renter 110 scans the Blockchain 130 for its storage contracts with hosts 105, extensions to those contracts with the same hosts 105, and statements from sentinels 113 confirming that problematic data has been repaired (i.e., FIX statements). If the renter 110 has not found sufficient information to reconstruct its stored data (process 2020), the renter 110 continues scanning the Blockchain 130.

After the renter 110 obtains the information needed to verify that it can retrieve accurate and complete data, the renter 110 sends a download contract proposal to each host 105 to retrieve its stored shards of data (process 2025). The renter 110 waits until it receives acceptances from a sufficient number of hosts 105 (process 2030). Then, the renter 110 retrieves the shards from the hosts 105 and reassembles the shards to obtain its data (process 2035).

Security analysis. Byzantine hosts may collude to reconstruct the data from its shards, since a STOR statement lists all hosts 105 containing shards, but this vulnerability can be mitigated in several ways. First, if there is no repair policy in place, the renter 110 may choose to keep the list of PUT contracts secret. For example, the renter 110 may keep the PUT list stored only locally—despite being subject to data loss. Alternatively, the renter 110 may store an encrypted version of the PUT list in another PUT (or STOR) contract, instead of using a STOR statement. This approach effectively decouples the PUT contracts for the data shards from any metadata that would link them together.

Finally, the renter 110 may encrypt the original data before sharing, so that Byzantine peers can only reconstruct something that is useless to them without the key FK.

Scalability analysis. There is no on-chain activity to retrieve a file.

Optimizations. The renter 110 can negotiate several GET contracts in parallel, maximizing its download bandwidth usage.

Additional Embodiments

The protocols discussed thus far represent exemplary embodiments of protocols for the DSS system 100. Additional protocols may provide functionality such as:

Allowing hosts 105 to transfer PUT contracts to other hosts 105. Such a protocol would allow hosts 105 to cleanly exit from the DSS system 100 much faster than currently possible, as the protocol would obviate the need to wait for existing PUT contracts to expire.

Adding support for early termination of any type of contract, including PUT, EXT, PERM, SEN, and any other long term contract.

Paying for a third-party upload, i.e., reservation storage space that will be used later by another member 105, 110, 113 to upload data.

Exemplary Use Cases

Data Backup and Archival

An archival Dapp can be implemented on top of the DSS system 100 by storing backup sets using STOR and RETR protocols. Additionally, customers can hire network-assisted data maintenance using SEN and FIX protocols. Long term archival can be achieved by extending contracts (EXT) up to the limit of the customer's retention policy.

A backup Dapp can provide disaster recovery using the identity of a customer, i.e., its key pair. The key pair can be preserved offline in any number of ways, for example, through a mnemonic recovery phrase. Using the identity, the backup Dapp will scan the blockchain (directly or through a third-party indexer) to retrieve all active contracts related to that user. From there, the Dapp can start negotiating GET contracts with many hosts 105 in parallel to maximize its download speed. It is important to notice that since the Blockchain 130 contains the full history of all storage contracts, there is no additional metadata needed, and thus no data loss in case of a catastrophic event.

Since the backup app can chose specific hosts 105, it can enforce special host selection policies, such as restricting hosts 105 to a specific geographic location or legal domain (e.g., for compliance with data privacy regulations).

Content Distribution Network

The DSS system 100 can be used as a Content Distribution Network (CDN) by using PUT, EXT, and PERM protocols. In some embodiments, content creators upload their content to many hosts 105, and negotiate download budgets with them. Viewers will be allowed to download the content for free (i.e., subsidized by the content creator), and load is balanced between the hosts 105 with the content.

Furthermore, in various embodiments, API content may be embedded directly in existing websites. The API server 140 may intermediate the negotiation with the hosts 105, and behave as a bridge to the DSS system 100.

Life-on-the-Cloud

Using the Dapps stack, developers can implement consistently replicated files across all devices belonging to a single user. The DSS system 100 provides the replicated, BFT, distributed log of data operations. The API 135 handles all the complexities of dealing with the Blockchain 215, and the Dapp can focus on providing the best user experience.

In one exemplary embodiment, DroboAccess, a service provided by Drobo, Inc. of San Jose, Calif., leverages the DSS system 100 to provide a high-bandwidth, highly available download link. DroboPix, another service provided by Drobo, Inc. of San Jose, Calif., can upload all pictures from a user's phone directly to the DSS system 100 (after encryption). These pictures may be synced to the user's home Drobo NAS automatically, at a later point in time, so that upload is not limited by the home connection speed.

Miscellaneous

The computer networks 212 generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems are necessarily non-conventional because, absent special programming or configuration, the conventional components do not inherently perform the described non-conventional methods.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method of reliably storing data in a storage system, the system being distributed over a network and having a stored blockchain accessible over the network to a host computing device and to a renter computing device, the method utilizing computer processes carried out by the host computing device comprising:

receiving over the network, by the host computing device from the renter computing device, a storage contract proposal;

sending over the network, by the host computing device to the renter computing device, an acceptance of the storage contract proposal;

a first determining step comprising determining that the blockchain has received from the renter computing device a signed storage contract and has stored the signed storage contract, and in response to performance of said first determining step:

receiving over the network, by the host computing device from the renter computing device, an upload of data to be stored according to the storage contract;

computing, by the host computing device, a checksum of the uploaded data from the renter computing device;

signing, by the host computing device, the checksum of the uploaded data; and sending over the network, by the host computing device to the renter computing device, the signed checksum of the uploaded data; and a second determining step comprising determining that the blockchain has received from the renter computing device the renter computing device's validation of the host's signed checksum, wherein the renter computing device's validation of the host's signed checksum comprises a signature of the checksum by the renter computing device; and in response to performance of said second determining step, maintaining by the host computing device the uploaded data in storage pursuant to the signed storage contract.

2. The method of claim 1, wherein sending the acceptance of the storage contract proposal further comprises:

adding a signature of the host computing device to the storage contract proposal.

3. The method of claim 1, wherein determining that the blockchain has received from the renter computing device a signed storage contract comprises:

determining that the blockchain is storing a storage contract that includes signatures of both the renter computing device and the host computing device.

4. The method of claim 1, further comprising:

storing, by the host computing device, the uploaded data received from the renter computing device.

5. The method of claim 1, further comprising:

encrypting, by the host computing device, the uploaded data received from the renter computing device.

6. The method of claim 1, further comprising:

after determining that the blockchain has received from the renter computing device the renter computing device's validation of the host's signed checksum, generating, by the host computing device, proof of storage of the data from the renter computing device.

7. The method of claim 6, further comprising:

sending over the network, by the host computing device to the blockchain, a signed statement including the proof of storage, according to the verification schedule of the storage contract.

* * * * *